(12) United States Patent
Akiyoshi

(10) Patent No.: US 11,429,225 B2
(45) Date of Patent: Aug. 30, 2022

(54) DISPLAY SYSTEM AND CONTROL METHOD

(71) Applicant: Panasonic Intellectual Property Management Co., Ltd., Osaka (JP)

(72) Inventor: Tomohiro Akiyoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/212,757

(22) Filed: Mar. 25, 2021

(65) Prior Publication Data

US 2021/0303126 A1 Sep. 30, 2021

(30) Foreign Application Priority Data

Mar. 27, 2020 (JP) .............................. JP2020-057757
Dec. 15, 2020 (JP) .............................. JP2020-207476

(51) Int. Cl.
*G06F 3/041* (2006.01)
*G06F 3/14* (2006.01)

(52) U.S. Cl.
CPC ........ *G06F 3/04166* (2019.05); *G06F 3/1446* (2013.01)

(58) Field of Classification Search
None
See application file for complete search history.

(56) References Cited

U.S. PATENT DOCUMENTS

| 9,285,937 B2 | 3/2016 | Kida et al. | |
| 2011/0234523 A1* | 9/2011 | Chang | G06F 3/0446 345/173 |
| 2014/0152617 A1 | 6/2014 | Kida et al. | |
| 2016/0147350 A1 | 5/2016 | Kida et al. | |
| 2017/0344171 A1* | 11/2017 | Qiao | G06F 3/038 |

FOREIGN PATENT DOCUMENTS

| JP | 2014-132445 | 7/2014 |
| JP | 2016-200886 | 12/2016 |

* cited by examiner

*Primary Examiner* — Carl Adams
(74) *Attorney, Agent, or Firm* — Greenblum & Bernstein, P.L.C.

(57) ABSTRACT

A first display device includes a plurality of first sensor electrodes. A second display device is arranged adjacent to the first display device, and includes a plurality of second sensor electrodes. A first drive circuit supplies a first touch drive signal to the plurality of first sensor electrodes. A second drive circuit supplies, to the plurality of second sensor electrodes, a second touch drive signal that has a frequency same as the frequency of the first touch drive signal and is in phase with the first touch drive signal.

9 Claims, 19 Drawing Sheets

(COMPARATIVE EXAMPLE)

DISPLAY SYSTEM AND CONTROL METHOD

BACKGROUND

1. Field

The present disclosure relates to a display system provided with a touch detection function, a control device, and a control method.

2. Description of the Related Art

In recent years, a display input device equipped with a touch display that displays a graphical user interface (GUI) on a display screen and inputs instructions by directly touching the display screen with a user's finger or the like has become widespread (e.g., see Patent Documents 1 and 2). This type of display input device can employ a simplified configuration compared to a display input device including an input unit, such as a button and a keyboard, separately from a display device, whereby it has been widely used in, for example, mobile terminals and terminals with limited installation space.
[Patent Document 1] JP 2014-132445 A
[Patent Document 2] JP 2016-200886 A

SUMMARY

Further improvements are needed in display systems including touch displays.

In order to solve the problem mentioned above, a display system according to one aspect of the present disclosure includes: a first display device including a plurality of first sensor electrodes; a second display device that is arranged adjacent to the first display device and including a plurality of second sensor electrodes; a first drive circuit that supplies a first touch drive signal to the plurality of first sensor electrodes; a second drive circuit that supplies a second touch drive signal to the plurality of second sensor electrodes, the second touch drive signal having a frequency same as a frequency of the first touch drive signal and being in phase with the first touch drive signal; a first touch detection circuit that detects a touch by an object on the first display device on the basis of a touch detection signal received from each of the plurality of first sensor electrodes; and a second touch detection circuit that detects a touch by an object on the second display device on the basis of a touch detection signal received from each of the plurality of second sensor electrodes.

Another aspect of the present disclosure is also directed to a display system. This display system includes: a first display device including a plurality of first sensor electrodes; a second display device that is arranged adjacent to the first display device and including a plurality of second sensor electrodes; a first drive circuit that supplies a first touch drive signal to the plurality of first sensor electrodes; a second drive circuit that supplies a second touch drive signal, which has a frequency same as the frequency of the first touch drive signal, to the plurality of second sensor electrodes; a first touch detection circuit that integrates a touch detection signal received from each of the plurality of first sensor electrodes during a first period and detects a touch by an object on the first display device on the basis of an integrated value; and a second touch detection circuit that integrates a touch detection signal received from each of the plurality of second sensor electrodes during a second period and detects a touch by an object on the second display device on the basis of an integrated value. Each of the first touch drive signal and the second touch drive signal changes between a first voltage and a second voltage, and each of the first period and the second period includes a period from a first timing at which, of the first touch drive signal and the second touch drive signal, the one whose phase is advanced changes from the first voltage to the second voltage to a second timing. The second timing is a timing at which a current flowing between the first sensor electrode of the first display device and the second sensor electrode of the second display device, which are adjacent to each other, becomes zero, the current flowing due to a situation where, of the first touch drive signal and the second touch drive signal, the one whose phase is delayed changes from the first voltage to the second voltage. A timing at which the second touch drive signal changes from the first voltage to the second voltage and the second timing are located between the first timing and a timing at which the first touch drive signal changes from the second voltage to the first voltage.

A further aspect of the present disclosure is directed to a control device. This device is a control device that controls a first display device including a plurality of first sensor electrodes and a second display device that is arranged adjacent to the first display device and including a plurality of second sensor electrodes, the control device including: a first drive circuit that supplies a first touch drive signal to the plurality of first sensor electrodes; a second drive circuit that supplies a second touch drive signal to the plurality of second sensor electrodes, the second touch drive signal having a frequency same as the frequency of the first touch drive signal and being in phase with the first touch drive signal; a first touch detection circuit that detects a touch by an object on the first display device on the basis of a touch detection signal received from each of the plurality of first sensor electrodes; and a second touch detection circuit that detects a touch by an object on the second display device on the basis of a touch detection signal received from each of the plurality of second sensor electrodes.

A further aspect of the present disclosure is directed to a control method. This method is a control method for controlling a first display device including a plurality of first sensor electrodes and a second display device that is arranged adjacent to the first display device and including a plurality of second sensor electrodes, the method including: supplying a first touch drive signal to the plurality of first sensor electrodes; supplying a second touch drive signal to the plurality of second sensor electrodes, the second touch drive signal having a frequency same as the frequency of the first touch drive signal and being in phase with the first touch drive signal; detecting a touch by an object on the first display device on the basis of a touch detection signal received from each of the plurality of first sensor electrodes; and detecting a touch by an object on the second display device on the basis of a touch detection signal received from each of the plurality of second sensor electrodes.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
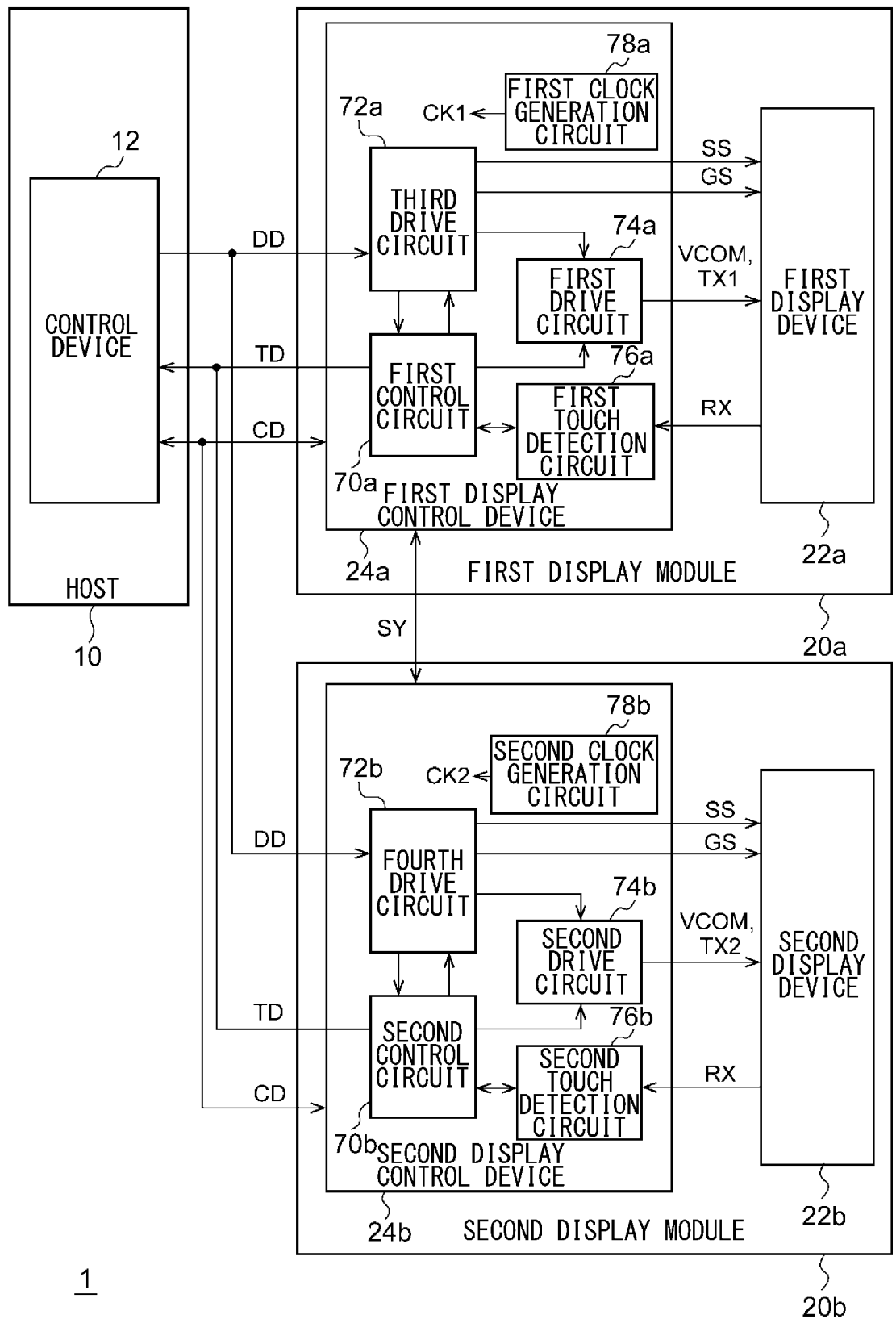
FIG. 1 is a block diagram of a display system according to a first embodiment.

The invention will now be described by reference to the preferred embodiments. This does not intend to limit the scope of the present invention, but to exemplify the invention.

Base Findings of Present Disclosure

Before specific description of embodiments are given, the base findings will be described. In some cases, two touch displays that detect a touch position using a self-capacitance method are arranged side by side to form a large-screen touch display. The two touch displays are arranged in contact with each other in such a manner that the boundary is inconspicuous. In this case, the present inventor has found a problem that a touch may be erroneously detected near the boundary between the two touch displays even if there is no touch. In order to solve the problem, a display system according to the present disclosure is configured as described below.

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

First Embodiment

FIG. 1 is a block diagram of a display system 1 according to a first embodiment. Although an example will be described in which the display system 1 is a vehicle-mounted display system 1 mounted on a vehicle, such as an automobile, the application is not particularly limited, and the display system 1 may also be used for a mobile device, for example.

The display system 1 includes a host 10, a first display module 20$a$, and a second display module 20$b$. Hereinafter, the first display module 20$a$ and the second display module 20$b$ will be called a display module 20 in the case of not being distinguished from each other. The display module 20 is also called a display panel.

The host 10 performs various functions, such as radio, car navigation, and Bluetooth (registered trademark) communication, and controls the two display modules 20. The host 10 includes a control device 12. The host 10 is arranged on a substrate different from the first display module 20$a$ and the second display module 20$b$, for example.

The control device 12 may be a central processing unit (CPU), for example, and also called a host CPU. The control device 12 supplies image data DD and control data CD to the two display modules 20, and controls the two display modules 20 on the basis of such data.

The first display module 20$a$ includes a first display device 22$a$ and a first display control device 24$a$. The second display module 20$b$ includes a second display device 22$b$ and a second display control device 24$b$. Hereinafter, the first display device 22$a$ and the second display device 22$b$ will be called a display device 22 in the case of not being distinguished from each other, and the first display control device 24$a$ and the second display control device 24$b$ will be called a display control device 24 in the case of not being distinguished from each other.

The two display devices 22 are used, for example, as a center display, on which a car navigation screen or the like is displayed, within a vehicle cabin, and are arranged to be adjacent to each other in the horizontal direction or the vertical direction. The two display devices 22 are arranged with almost no gap therebetween. The two display devices 22 may each display a part of one screen, such as a car navigation screen, to form one screen with two screens, or one of them may display a first screen, such as a car navigation screen, while the other one may display a second screen, such as a television screen, which is different from the first screen.

The display device 22 is an in-cell liquid crystal display device of an in plane switching (IPS) type and configured as a touch display on which a touch position can be detected. The configuration of the display device 22 may be a well-known configuration as described below, for example.

Figure 2:
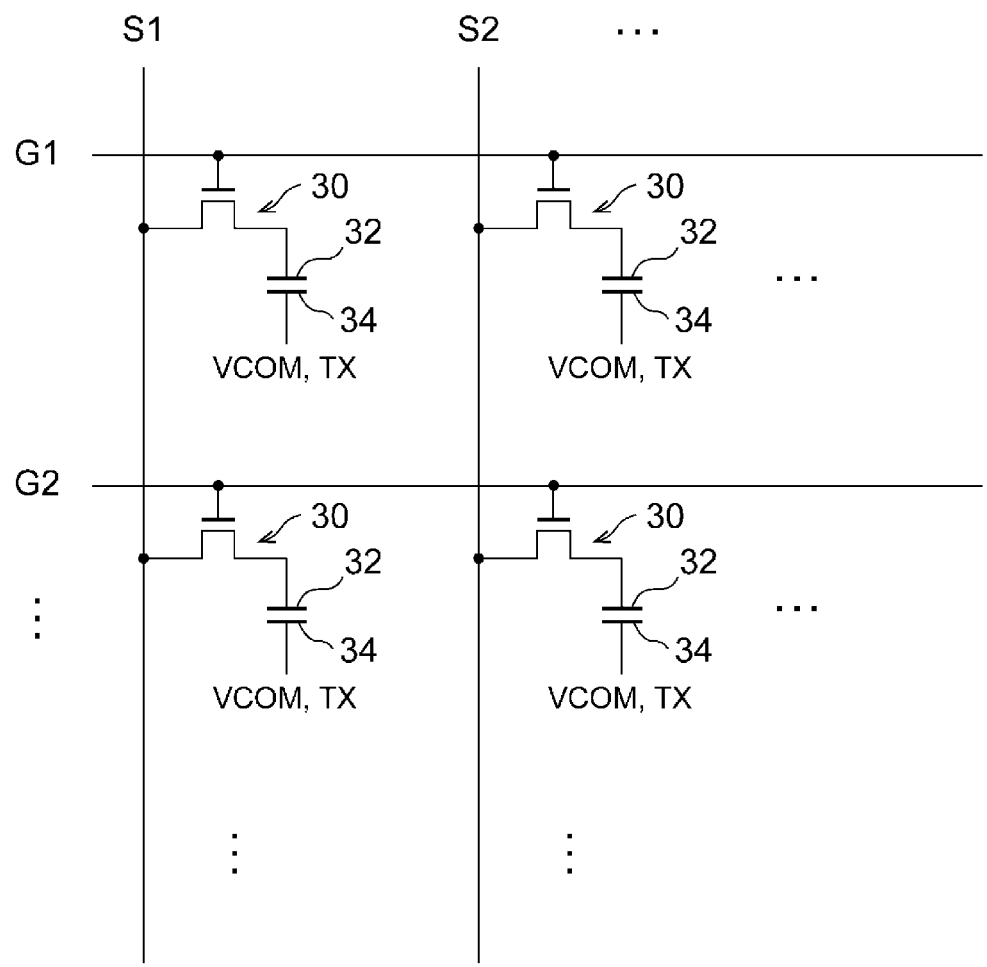
FIG. 2 is a diagram schematically illustrating a circuit configuration of a display device in FIG. 1.

FIG. 2 schematically illustrates a circuit configuration of the display device 22 in FIG. 1. FIG. 2 also illustrates a schematic arrangement of constituent elements. The display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. A liquid crystal layer is controlled by means of electric fields between the pixel electrodes 32 and the common electrodes 34. The common electrodes 34 are used for both image display and touch detection. Accordingly, the number of electrode layers can be reduced, whereby the display device 22 can be made thinner. The common electrodes 34 of the first display device 22a may also be referred to as first sensor electrodes. The common electrodes 34 of the second display device 22b may also be referred to as second sensor electrodes.

Figure 3:
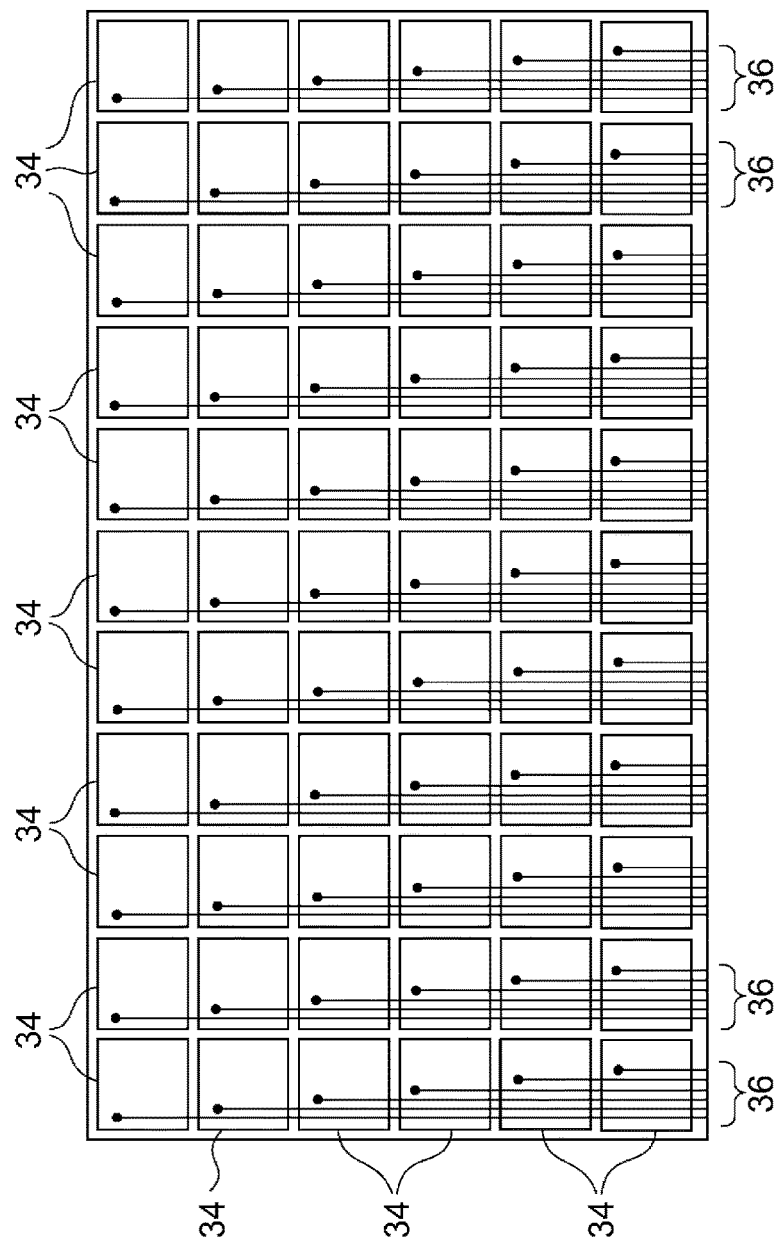
FIG. 3 is a top view illustrating an arrangement of common electrodes in FIG. 2.

FIG. 3 is a top view illustrating an arrangement of the common electrodes 34 in FIG. 2. The multiple common electrodes 34 are arranged in a matrix. Each of the common electrodes 34 of the first display device 22a is connected to the first display control device 24a by a signal line 36, and each of the common electrodes 34 of the second display device 22b is connected to the second display control device 24b by a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

Figure 4:
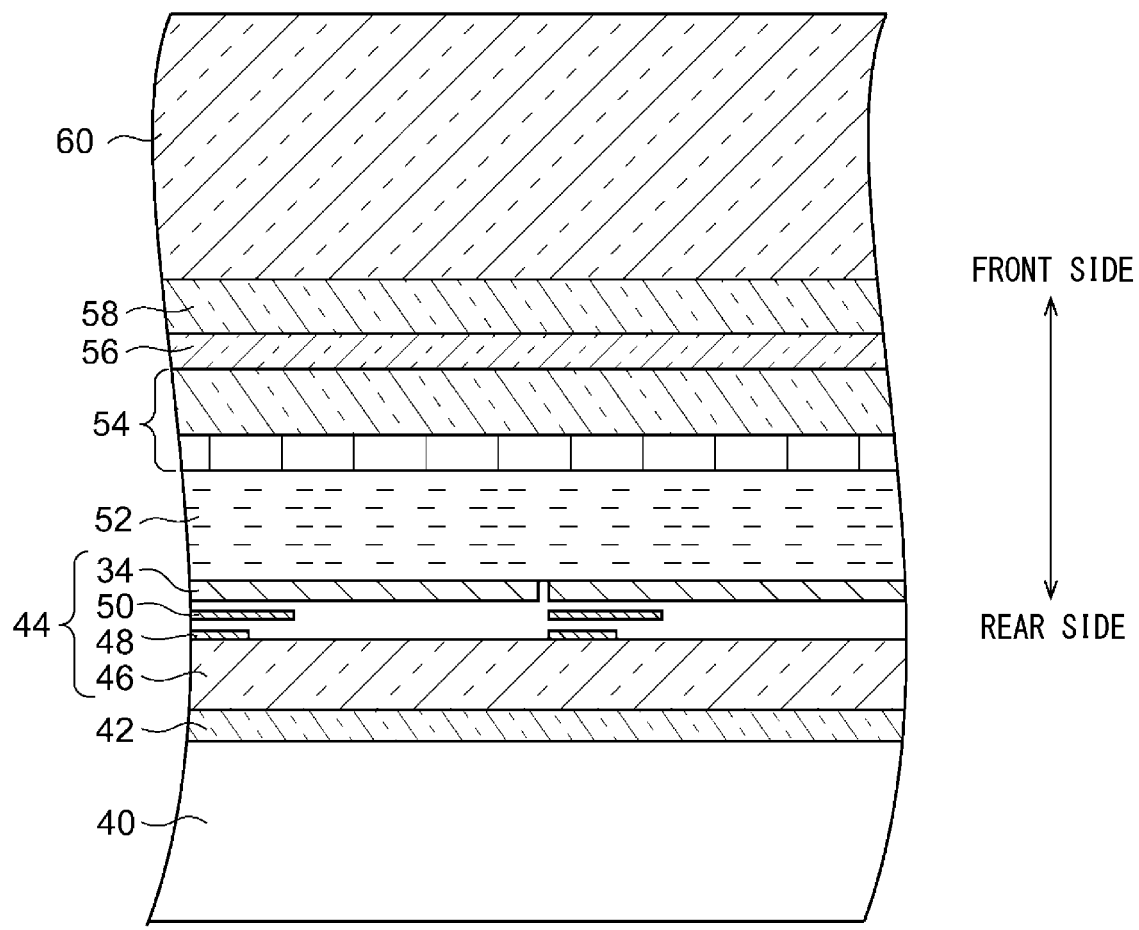
FIG. 4 is a longitudinal sectional view of the display device in FIG. 1.

FIG. 4 is a longitudinal sectional view of the display device 22 in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though the illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens, for example.

The description now returns to FIG. 1. The first display control device 24a may be configured as an IC, for example, and controls the first display device 22a on the basis of the control data CD and the image data DD from the host 10. The first display control device 24a includes a first control circuit 70a, a third drive circuit 72a, a first drive circuit 74a, a first touch detection circuit 76a, and a first clock generation circuit 78a.

The first control circuit 70a is composed of, for example, a microcomputer, and controls signal generation of the first clock generation circuit 78a, the third drive circuit 72a, and the first drive circuit 74a, the operation timing of the first touch detection circuit 76a, and the like.

The first control circuit 70a controls the third drive circuit 72a, the first drive circuit 74a, and the first touch detection circuit 76a such that, during a first frame period, one frame of a display image is rendered on the first display device 22a and touch detection for one screen is performed at least once. The first frame period may also be referred to as a first vertical synchronization period. The first frame period will be detailed later.

The first clock generation circuit 78a generates a first reference clock signal CK1 under the control of the first control circuit 70a. The third drive circuit 72a generates, under the control of the first control circuit 70a, a source signal SS on the basis of the image data DD from the host 10 and the generated first reference clock signal CK1. The third drive circuit 72a generates, under the control of the first control circuit 70a, a gate signal GS on the basis of the generated first reference clock signal CK1.

The third drive circuit 72a supplies the source signal SS serially to multiple source lines in the first display device 22a, and also supplies the gate signal GS serially to multiple gate lines in the first display device 22a.

The first drive circuit 74a generates, under the control of the first control circuit 70a, a reference voltage VCOM that is a predetermined fixed voltage, and also generates a first touch drive signal TX1 in synchronization with the generated first reference clock signal CK1. The first touch drive signal TX1 is in phase with the first reference clock signal CK1. Note that the first touch drive signal TX1 may be a square wave signal, or may be a sine wave signal. Through the signal lines 36 shown in FIG. 3, the first drive circuit 74a supplies the reference voltage VCOM or the first touch drive signal TX1 to the multiple common electrodes 34 in the entire first display device 22a.

The first touch detection circuit 76a detects a touch by an object on the first display device 22a. Under the control of the first control circuit 70a, the first touch detection circuit 76a detects a touch by an object on a position corresponding to a common electrode 34 on the basis of a touch detection signal RX received from the common electrode 34 when the first touch drive signal TX1 is supplied to each common electrode 34.

The first touch detection circuit 76a integrates, for each pulse of the first touch drive signal TX1, the touch detection signal RX received from each common electrode 34 during a predetermined reference time from the rise of the pulse, and derives a difference value between the integrated value and the reference value. The first touch detection circuit 76a integrates, for each pulse of the touch drive signal TX, the touch detection signal RX received from each common electrode 34 during a reference time from the fall of the pulse, and derives a difference value between the integrated value and the reference value. The difference value may be derived for either the rise or the fall of the pulse. For the touch detection signal RX received from one common electrode 34 during one touch detection period, difference values of the number proportional to the number of pulses of the first touch drive signal TX1 in one touch detection period are obtained. Each value represents a difference value between the capacitance of the common electrode 34 and a reference capacitance. The first touch detection circuit 76a calculates, for each common electrode 34, a value obtained by averaging those difference values as a detection value. As the capacitance variation in the common electrode 34 due to a touch by an object becomes larger, the detection value becomes larger. When there is no touch and the capacitance variation in the common electrode 34 is zero, the detection value is also zero.

The first touch detection circuit 76a compares the detection value derived based on the touch detection signal RX received from each common electrode 34 with a predetermined touch detection threshold value, and when the detection value is equal to or greater than the touch detection threshold value, it determines that there has been a touch to the position of the corresponding common electrode 34. This corresponds to detection of a touch. The first touch detection circuit 76a detects a touch position within the screen on the basis of the position of the common electrode 34 to which it is judged that there has been a touch. The first touch detection circuit 76a outputs information associated with the detected touch position to the first control circuit 70a.

The first control circuit 70a derives coordinate data TD of the touch position on the basis of the touch position information from the first touch detection circuit 76a, and outputs the coordinate data TD to the control device 12 in the host 10. The control device 12 performs various processes on the basis of the coordinate data TD.

The first clock generation circuit 78a generates a synchronization signal SY in synchronization with the first reference clock signal CK1, and outputs the synchronization signal SY to the second display control device 24b at each start timing of the first frame period, for example. For example, the synchronization signal SY is a pulse that rises at the start timing of the first frame period, and is in phase with the first reference clock signal CK1. The output timing of the synchronization signal SY is not particularly limited as long as the signal can be synchronized between the first display control device 24a and the second display control device 24b. The wiring for transmitting the synchronization signal SY is connected from the first display control device 24a to the second display control device 24b via the substrate on which the host 10 is arranged.

The second display control device 24b may be configured as an IC, for example, and controls the second display device 22b on the basis of the control data CD and the image data DD from the host 10 and the synchronization signal SY from the first display control device 24a. Basic operation of the second display control device 24b is common to the operation of the first display control device 24a. The second display control device 24b includes a second control circuit 70b, a fourth drive circuit 72b, a second drive circuit 74b, a second touch detection circuit 76b, and a second clock generation circuit 78b.

The second control circuit 70b is composed of, for example, a microcomputer, and controls signal generation of the second clock generation circuit 78b, the fourth drive circuit 72b, and the second drive circuit 74b, the operation timing of the second touch detection circuit 76b, and the like on the basis of the synchronization signal SY. The second control circuit 70b and the above-mentioned first control circuit 70a may be collectively called a control circuit.

The second control circuit 70b controls the fourth drive circuit 72b, the second drive circuit 74b, and the second touch detection circuit 76b such that, during a second frame period, one frame of a display image is rendered on the second display device 22b and touch detection for one screen is performed at least once. The second control circuit 70b performs control such that the start timing of the second frame period coincides with the start timing of the first frame period on the basis of the synchronization signal SY. The second frame period may also be referred to as a second vertical synchronization period. The second frame period will be detailed later.

The second clock generation circuit 78b generates, under the control of the second control circuit 70b, a second reference clock signal CK2 that has a frequency same as the frequency of the first reference clock signal CK1 and is in synchronization with the first reference clock signal CK1. The second reference clock signal CK2 is in phase with the first reference clock signal CK1. The fourth drive circuit 72b generates, under the control of the second control circuit 70b, a source signal SS on the basis of the image data DD from the host 10 and the generated second reference clock signal CK2. The fourth drive circuit 72b generates, under the control of the second control circuit 70b, a gate signal GS on the basis of the generated second reference clock signal CK2.

The fourth drive circuit 72b supplies the source signal SS serially to multiple source lines in the second display device 22b, and also supplies the gate signal GS serially to multiple gate lines in the second display device 22b.

Under the control of the second control circuit 70b, the second drive circuit 74b generates a reference voltage VCOM, and also generates a second touch drive signal TX2 in synchronization with the generated second reference clock signal CK2. The second touch drive signal TX2 and the first touch drive signal TX1 have the same amplitude and the same frequency. The second touch drive signal TX2 is in phase with the second reference clock signal CK2. Therefore, the second touch drive signal TX2 is in phase with the first touch drive signal TX1. Note that the second touch drive signal TX2 may be a square wave signal, or may be a sine wave signal. Through the signal lines 36 shown in FIG. 3, the second drive circuit 74b supplies the reference voltage VCOM or the second touch drive signal TX2 to the multiple common electrodes 34 in the entire second display device 22b.

The second touch detection circuit 76b detects a touch by an object on the second display device 22b. Under the control of the second control circuit 70b, the second touch detection circuit 76b detects a touch by an object on a position corresponding to a common electrode 34 on the basis of a touch detection signal RX received from the common electrode 34 when the second touch drive signal TX2 is supplied to each common electrode 34. Specific operation is similar to that of the first touch detection circuit 76a. The second touch detection circuit 76b outputs information associated with the detected touch position to the second control circuit 70b.

The second control circuit 70b derives coordinate data TD of the touch position on the basis of the information associated with the touch position from the second touch detection circuit 76b, and outputs the coordinate data TD to the control device 12.

The configurations of the control device 12, the first control circuit 70a, and the second control circuit 70b can be implemented by cooperation between hardware resources and software resources or only by hardware resources. As the hardware resources, analog devices, microcomputers, digital signal processors (DSPs), read-only memories (ROMs), random-access memories (RAMs), field-programmable gate arrays (FPGAs), or other large-scale integrated circuits (LSIs) can be employed. As the software resources, programs, such as firmware, can be employed.

Figure 5:
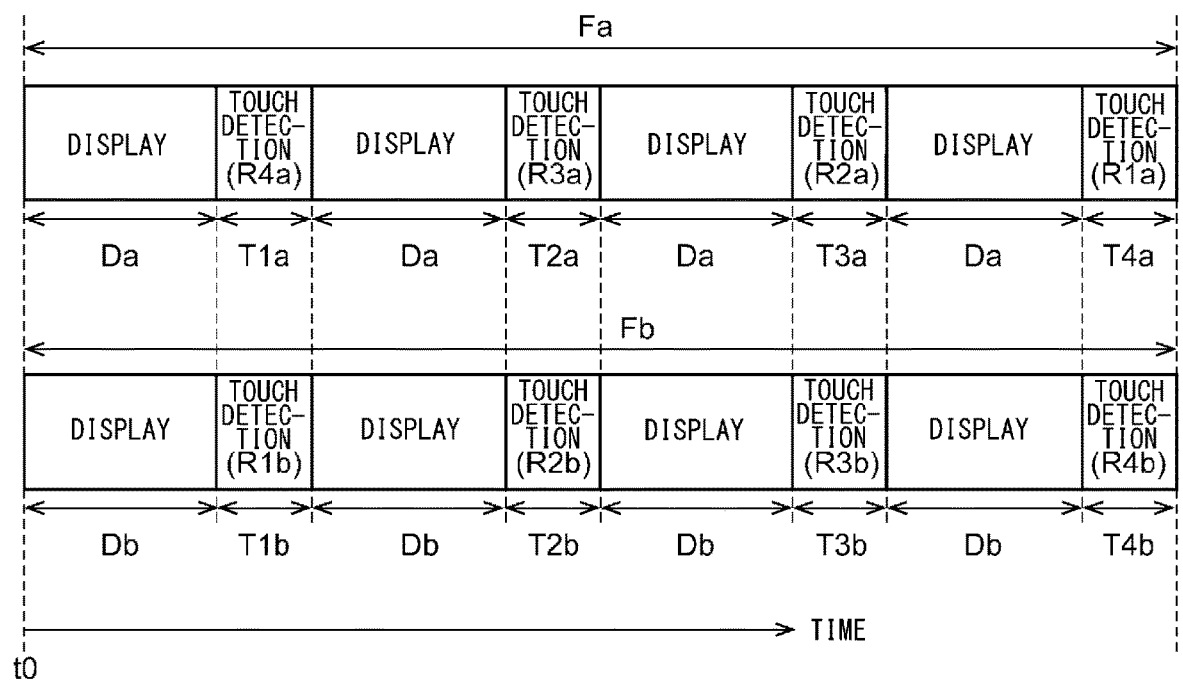
FIG. 5 is a diagram illustrating timing of a first frame period in a first display device and a second frame period in a second display device.

FIG. 5 illustrates timing of a first frame period Fa in the first display device 22a and a second frame period Fb in the second display device 22b.

The first frame period Fa includes four first display periods Da and four first touch detection periods T1a, T2a, T3a, and T4a. The first display periods Da and the first touch detection periods are alternately arranged. In the first frame period Fa, the first display period Da, first touch detection period T1a, first display period Da, first touch detection period T2a, first display period Da, first touch detection period T3a, first display period Da, and first touch detection period T4a are arranged in this order.

The second frame period Fb includes four second display periods Db and four second touch detection periods T1b, T2b, T3b, and T4b. The second display periods Db and the second touch detection periods are alternately arranged. In the second frame period Fb, the second display period Db, second touch detection period T1b, second display period Db, second touch detection period T2b, second display period Db, second touch detection period T3b, second display period Db, and second touch detection period T4b are arranged in this order.

The length of the first display period Da is equal to the length of the second display period Db. Each of the first touch detection periods T1a to T4a and the second touch detection periods T1b to T4b has the same length. The length of the first frame period Fa is equal to the length of the second frame period Fb. The start timing (time t0) of the first frame period Fa coincides with the start timing of the second frame period Fb. In the first touch detection period and the second touch detection period, which are in one-to-one correspondence, the start timing coincides and the end timing also coincides.

The number of the first display periods Da and the first touch detection periods in the first frame period Fa and the number of the second display periods Db and the second touch detection periods in the second frame period Fb are not limited to "4".

The first display device 22a displays one-fourth of a frame for each first display period Da. Accordingly, one frame is displayed in the four first display periods Da within the first frame period Fa. More specifically, during the first display period Da, the third drive circuit 72a supplies the source signal SS to the multiple source lines and also supplies the gate signal GS to corresponding gate lines, and the first drive circuit 74a supplies the reference voltage VCOM to the multiple common electrodes 34. The first drive circuit 74a stops supply of the first touch drive signal TX1 during the first display periods Da.

The second display device 22b displays one-fourth of a frame for each second display period Db. Accordingly, one frame is displayed in the four second display periods Db within the second frame period Fb. More specifically, during the second display period Db, the fourth drive circuit 72b supplies the source signal SS to the multiple source lines and also supplies the gate signal GS to corresponding gate lines, and the second drive circuit 74b supplies the reference voltage VCOM to the multiple common electrodes 34. The second drive circuit 74b stops supply of the second touch drive signal TX2 during the second display periods Db.

Figure 6A:
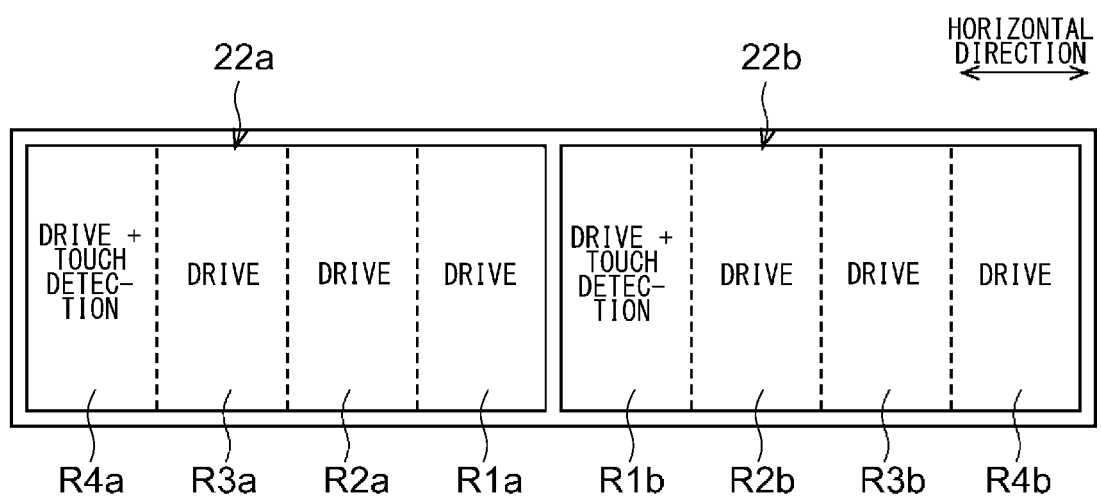
FIG. 6A is a diagram illustrating operation of the display device during a first touch detection period T1$a$ in FIG. 5.

FIG. 6A is a diagram illustrating operation of the display device 22 during the first touch detection period T1a in FIG. 5. The first display device 22a and the second display device 22b are arranged adjacent to each other in the horizontal direction when viewed from a viewer.

The first display device 22a includes first touch detection areas R4a, R3a, R2a, and R1a, which are arranged in order in the direction approaching the second display device 22b. That is, the first touch detection areas R1a, R2a, R3a, and R4a are arranged in the horizontal direction, which is the direction along the arrangement direction of the first display device 22a and the second display device 22b. The rightmost first touch detection area R1a is adjacent to the second display device 22b. Among the multiple common electrodes 34 of the entire first display device 22a, multiple common electrodes 34 are arranged in each of the first touch detection areas R1a to R4a.

The second display device 22b includes second touch detection areas R1b, R2b, R3b, and R4b arranged in order in the direction receding from the first display device 22a. That is, the second touch detection areas R1b, R2b, R3b, and R4b are arranged in the horizontal direction. The leftmost second touch detection area R1b is adjacent to the first display device 22a. Among the multiple common electrodes 34 of the entire second display device 22b, multiple common electrodes 34 are arranged in each of the second touch detection areas R1b to R4b. The number of touch detection areas of one display device 22 is not limited to "4".

During the first touch detection period T1a, the first drive circuit 74a supplies the first touch drive signal TX1 to the multiple common electrodes 34 of the entire first display device 22a. During the first touch detection period T1a, the first touch detection circuit 76a detects a touch by an object on the first touch detection area R4a on the basis of the touch detection signals RX received from the multiple common electrodes 34 in the first touch detection area R4a to be subject to detection.

During the second touch detection period T1b, the second drive circuit 74b supplies the second touch drive signal TX2 to the multiple common electrodes 34 of the entire second display device 22b. During the second touch detection period T1b, the second touch detection circuit 76b detects a touch by an object on the second touch detection area R1b on the basis of the touch detection signals RX received from the multiple common electrodes 34 in the second touch detection area R1b to be subject to detection.

Figure 6B:
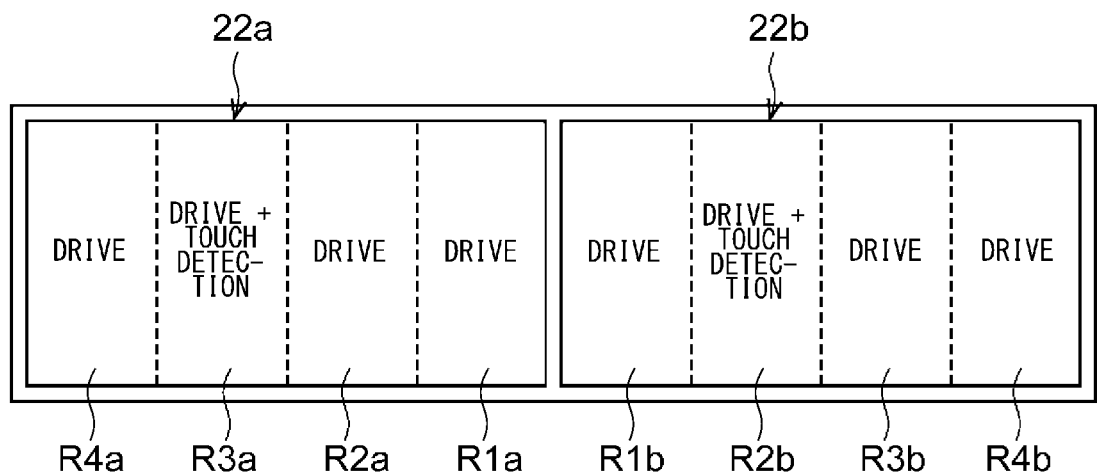
FIG. 6B is a diagram illustrating operation of the display device in a first touch detection period T2$a$.

FIG. 6B is a diagram illustrating operation of the display device 22 during the first touch detection period T2a. Operation of the first drive circuit 74a and the second drive circuit 74b during each touch detection period is common, and thus descriptions thereof will be omitted. During the first touch detection period T2a, the first touch detection circuit 76a detects a touch on the first touch detection area R3a on the basis of the touch detection signals RX received from the multiple common electrodes 34 in the first touch detection area R3a to be subject to detection.

During the second touch detection period T2b, the second touch detection circuit 76b detects a touch on the second touch detection area R2b on the basis of the touch detection signals RX received from the multiple common electrodes 34 in the second touch detection area R2b to be subject to detection.

Figure 7A:
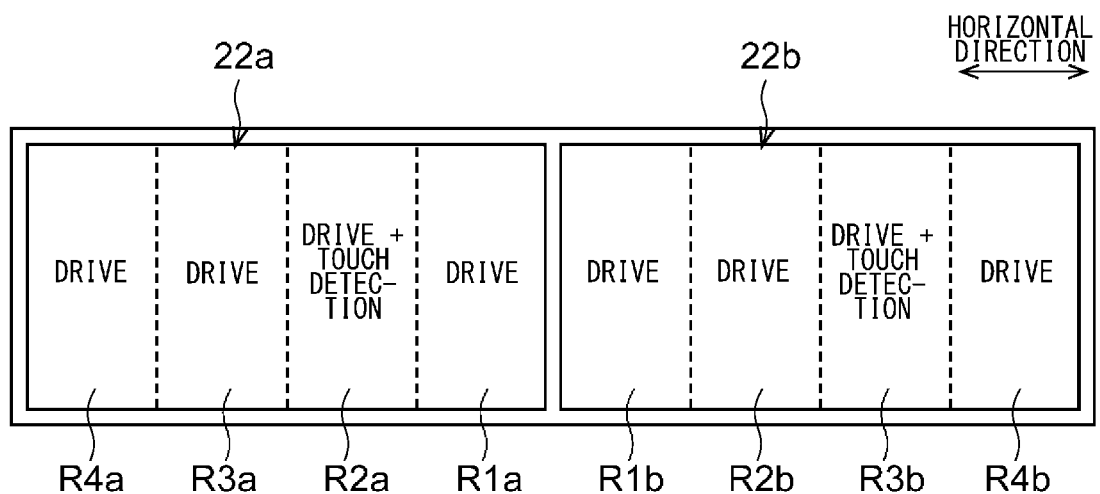
FIG. 7A is a diagram illustrating operation of the display device in a first touch detection period T3$a$.

FIG. 7A is a diagram illustrating operation of the display device 22 during the first touch detection period T3a. During the first touch detection period T3a, the first touch detection circuit 76a detects a touch on the first touch detection area R2a on the basis of the touch detection signals RX received from the multiple common electrodes 34 in the first touch detection area R2a to be subject to detection.

During the second touch detection period T3b, the second touch detection circuit 76b detects a touch on the second touch detection area R3b on the basis of the touch detection signals RX received from the multiple common electrodes 34 in the second touch detection area R3b to be subject to detection.

Figure 7B:
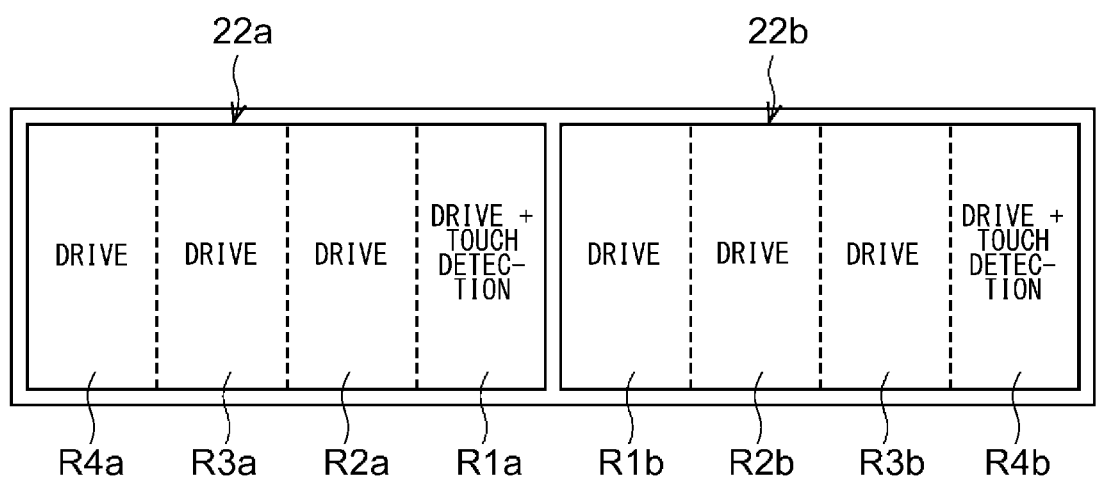
FIG. 7B is a diagram illustrating operation of the display device in a first touch detection period T4$a$.

FIG. 7B is a diagram illustrating operation of the display device 22 during the first touch detection period T4a. During the first touch detection period T4a, the first touch detection circuit 76a detects a touch on the first touch detection area R1a on the basis of the touch detection signals RX received from the multiple common electrodes 34 in the first touch detection area R1a to be subject to detection.

During the second touch detection period T4b, the second touch detection circuit 76b detects a touch on the second touch detection area R4b on the basis of the touch detection signals RX received from the multiple common electrodes 34 in the second touch detection area R4b to be subject to detection.

In this manner, the first touch detection circuit 76a detects a touch in a different first touch detection area for each first touch detection period. During the four first touch detection periods in the first frame period Fa, touch detection for one screen is performed once.

The second touch detection circuit 76b detects a touch in a different second touch detection area for each second touch detection period. During the four second touch detection periods in the second frame period Fb, touch detection for one screen is performed once.

Figure 8:
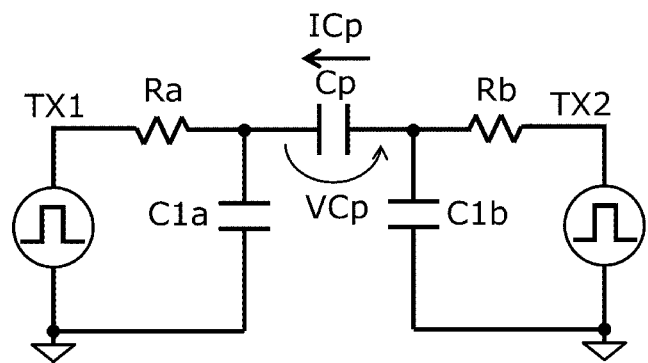
FIG. 8 is an equivalent circuit schematic of a common electrode of the first display device and a common electrode of the second display device, which are adjacent to each other.

FIG. 8 is an equivalent circuit schematic of the common electrode 34 of the first display device 22a and the common electrode 34 of the second display device 22b, which are adjacent to each other. A resistor Ra is a wiring resistance of the signal line 36 connected to the common electrode 34 of the first display device 22a. A capacitance C1a is a parasitic capacitance with respect to the ground potential of the common electrode 34 of the first display device 22a, which corresponds to the reference capacitance described above.

A resistor Rb is a wiring resistance of the signal line 36 connected to the common electrode 34 of the second display device 22b. A capacitance C1b is a parasitic capacitance with respect to the ground potential of the common electrode 34 of the second display device 22b, which corresponds to the reference capacitance.

A capacitance Cp is a parasitic capacitance between the common electrode 34 of the first display device 22a and the common electrode 34 of the second display device 22b, which are adjacent to each other. The two display devices 22 are arranged with almost no gap therebetween so that the boundary is inconspicuous as described above, and thus the parasitic capacitance is generated between those common electrodes 34.

The first touch drive signal TX1 is supplied to one end of the capacitance Cp via the resistor Ra. The second touch drive signal TX2 is supplied to the other end of the capacitance Cp via the resistor Rb. A voltage VCp is a voltage between both ends of the capacitance Cp, and a current ICp is a current flowing through the capacitance Cp.

Figure 9:
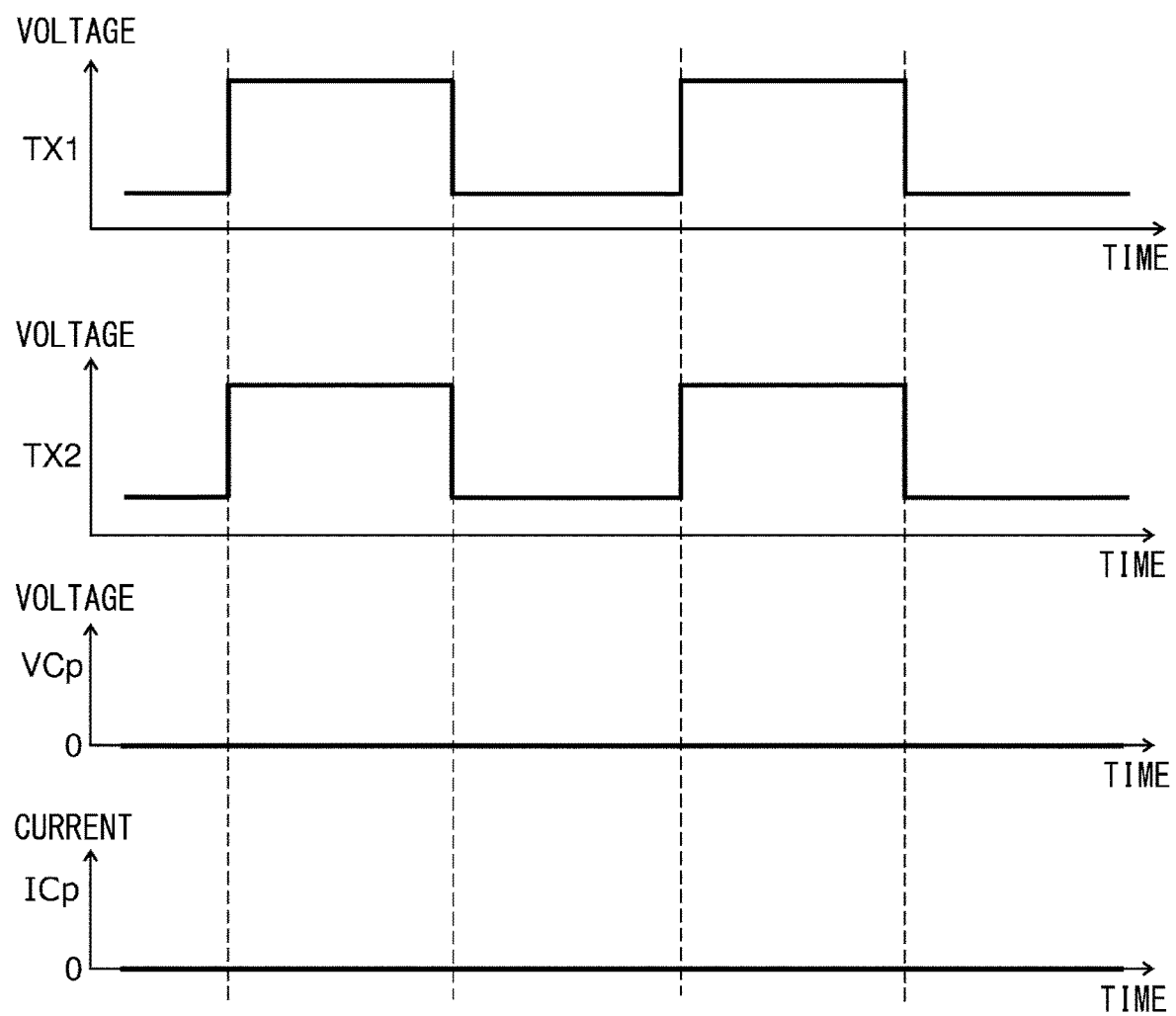
FIG. 9 is a graph illustrating exemplary waveforms of a first touch drive signal, a second touch drive signal, a voltage, and a current in FIG. 8.

FIG. 9 illustrates exemplary waveforms of the first touch drive signal TX1, the second touch drive signal TX2, the voltage VCp, and the current ICp in FIG. 8.

The first touch drive signal TX1 and the second touch drive signal TX2 have the same phase, the same frequency, and the same amplitude. Between the first touch drive signal TX1 and the second touch drive signal TX2, the rise timing and the fall timing coincide. Therefore, no potential difference is generated between both ends of the capacitance Cp, and the voltage VCp is substantially maintained at 0 V. Accordingly, the current ICp is substantially 0 A.

Figure 10:
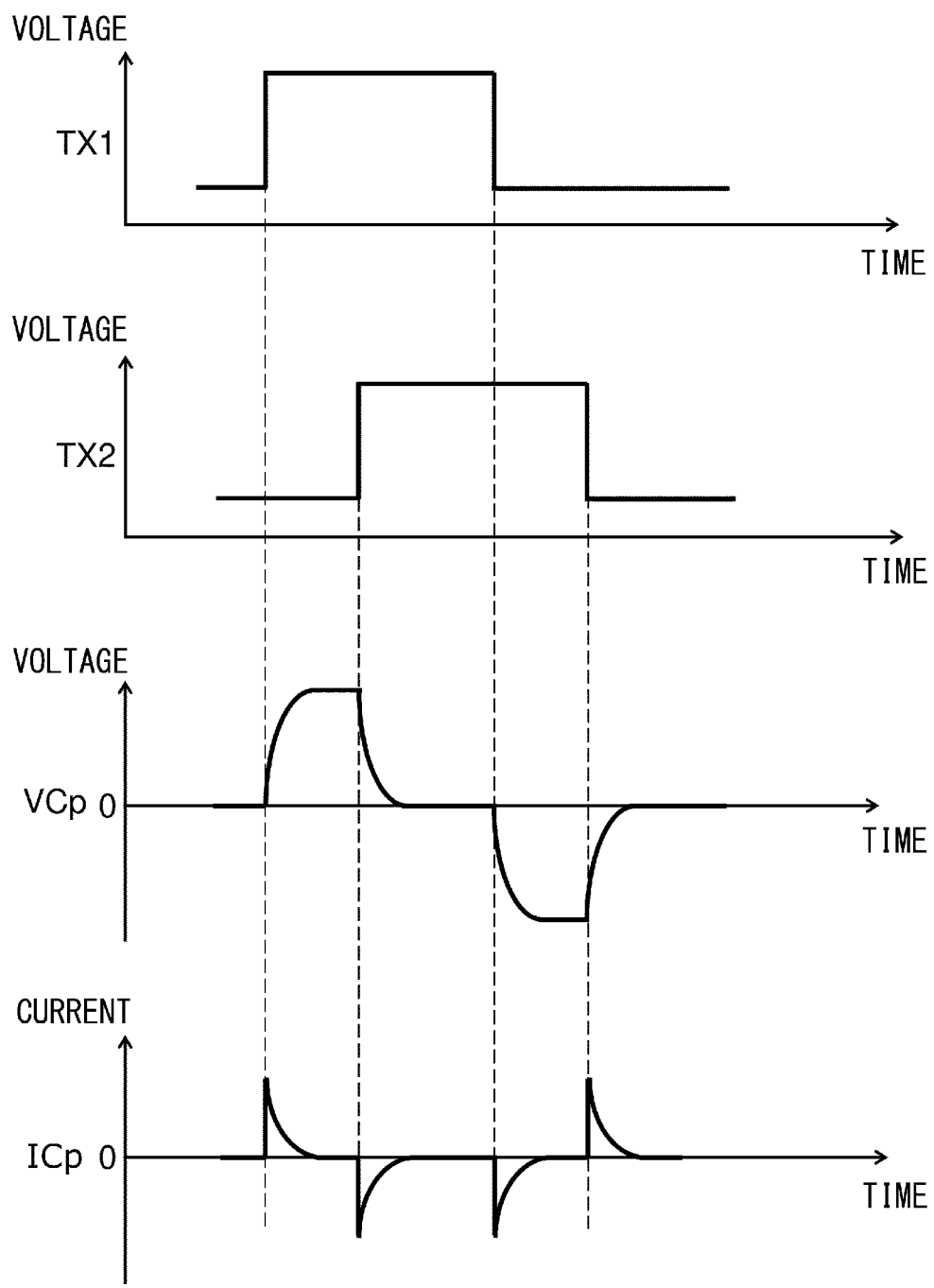
FIG. 10 is a graph illustrating exemplary waveforms of a first touch drive signal, a second touch drive signal, a voltage, and a current of a display system of a comparative example.

A comparative example will now be described. FIG. 10 illustrates exemplary waveforms of the first touch drive signal TX1, the second touch drive signal TX2, the voltage VCp, and the current ICp of a display system of the comparative example.

The comparative example is different from the present embodiment in that the phase of the first touch drive signal TX1 is different from that of the second touch drive signal TX2. That is, in the comparative example, the rise timing is different and also the fall timing is different between the first touch drive signal TX1 and the second touch drive signal TX2. Therefore, a period in which a potential difference is generated between both ends of the capacitance Cp is periodically present, and the voltage VCp periodically changes between positive and negative. Accordingly, the current ICp that charges and discharges the parasitic capacitance Cp periodically flows. In the first display device, the current ICp is added to the current that charges the parasitic capacitance with respect to the ground potential of the common electrode adjacent to the second display device, whereby the integrated value of the current in the case with no touch increases compared to the common electrode not adjacent to the second display device, and it may be erroneously detected that, even if there is no touch, there are touches at positions of the multiple common electrodes adjacent to the second display device. Similarly, touches may be erroneously detected at positions of the multiple common electrodes adjacent to the first display device in the second display device.

In contrast to the comparative example, in the present embodiment, the first touch drive signal TX1 is in phase with the second touch drive signal TX2 as described above, whereby the potential difference between the common electrode 34 of the first display device 22a and the common electrode 34 of the second display device 22b, which are adjacent to each other, can be substantially eliminated. As a result, charging and discharging of the parasitic capacitance Cp between those common electrodes 34 can be suppressed, and the integrated value of the current in the case with no touch in each of those common electrodes 34 can be made equal to the integrated value of the current in the case with no touch in the other common electrode 34. Accordingly, it becomes possible to suppress erroneous detection of a touch near the boundary between the first display device 22a and the second display device 22b.

Note that "the first touch drive signal TX1 is in phase with the second touch drive signal TX2" means that there may be a negligible phase difference in such a degree that a touch is not erroneously detected. This phase difference is smaller than the phase difference corresponding to the period during which the current ICp is flowing. For example, when the positive current ICp flows due to the rise of the first touch drive signal TX1 and then the negative current ICp flows due to the rise of the second touch drive signal TX2 while the current ICp is decreasing, the integrated value of the negative current ICp is smaller than that of the comparative example. Even in this case, it is possible to suppress erroneous detection of a touch as compared with the comparative example.

Second Embodiment

In the first embodiment, the drive capabilities of the first drive circuit 74a and the second drive circuit 74b may differ due to variations in electrical characteristics and temperature differences between the first drive circuit 74a and the second drive circuit 74b. Similarly, the drive capabilities of the elements constituting the first clock generation circuit 78a and the second clock generation circuit 78b may also differ. In such a case, the phase difference between the first reference clock signal CK1 and the second reference clock signal CK2 and the phase difference between the first touch drive signal TX1 and the second touch drive signal TX2 become large, and a touch is likely to be erroneously detected near the boundary between the first display device 22a and the second display device 22b. In particular, in the vehicle-mounted display system 1, there is a difference in temperature in the configuration of the vehicle on the rear side of the two display modules 20, whereby the difference in temperature of the two display modules 20 may increase.

In view of the above, a second embodiment is different from the first embodiment in that a phase difference between the first touch drive signal TX1 and the second touch drive signal TX2 is acquired and the phase difference is controlled. In the following, description will be given mainly for the differences from the first embodiment.

Figure 11:
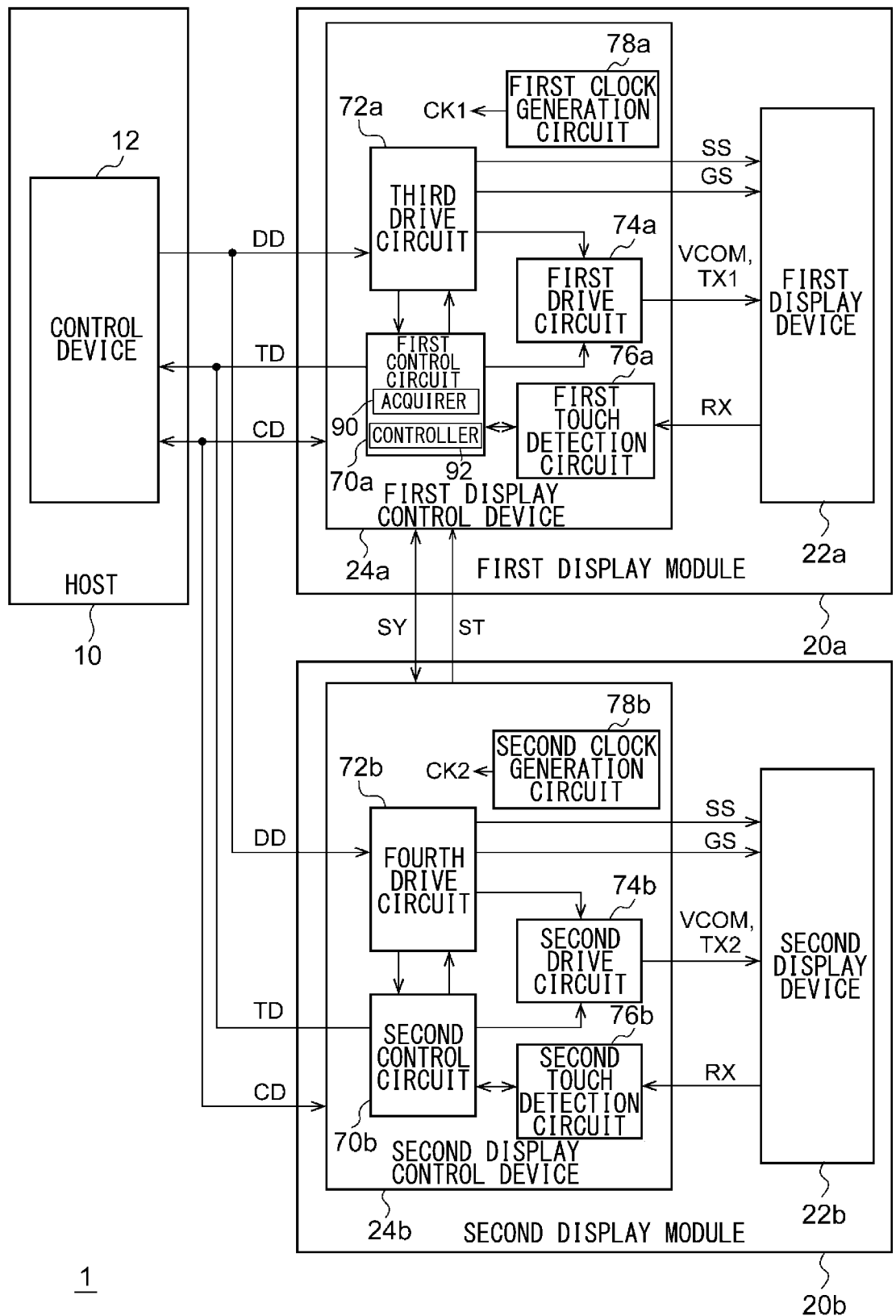
FIG. 11 is a block diagram of a display system according to a second embodiment.

FIG. 11 is a block diagram of a display system 1 according to a second embodiment. A second display control device 24b supplies a timing signal ST to a first display control device 24a. The timing signal ST may be, for example, a second touch drive signal TX2. The timing signal ST is not particularly limited as long as it is a signal that can specify the rise timing of the second touch drive signal TX2, and may be a pulse indicating the rise timing of the second touch drive signal TX2, or may be a pulse indicating the start timing of a touch detection period. The pulse indicating the start timing of the touch detection period can be generated on the basis of a horizontal synchronization signal, and indicates that the second touch drive signal TX2 rises after a predetermined wait time from the rise timing of the pulse.

A first control circuit 70a includes an acquirer 90 and a controller 92. The acquirer 90 acquires a phase difference between the first touch drive signal TX1 and the second touch drive signal TX2 on the basis of the timing signal ST supplied from the second display control device 24b and the first touch drive signal TX1 generated by a first drive circuit 74a.

The controller 92 controls the phase of the first touch drive signal TX1 in such a manner that the phase difference acquired by the acquirer 90 approaches zero. For example, the controller 92 controls the first drive circuit 74a to provide a phase difference between the first reference clock signal CK1 and the first touch drive signal TX1.

The controller 92 may control the phase of the second touch drive signal TX2 instead of the phase of the first touch drive signal TX1. In this case, the controller 92 may control the first clock generation circuit 78a to provide a phase difference between the first reference clock signal CK1 and a synchronization signal SY. On the basis of the phase-controlled synchronization signal SY, the second drive circuit 74b generates the second touch drive signal TX2 with a phase difference with respect to the first touch drive signal TX1 approaching to zero. Alternatively, the controller 92 may supply data indicating the phase difference to the second display control device 24b, and the second drive circuit 74b may generate, on the basis of the data indicating the phase difference, the second touch drive signal TX2 with a phase difference with respect to the first touch drive signal TX1 approaching to zero. The acquirer 90 and the controller 92 periodically execute the process described above at a predetermined frequency.

Figure 12:
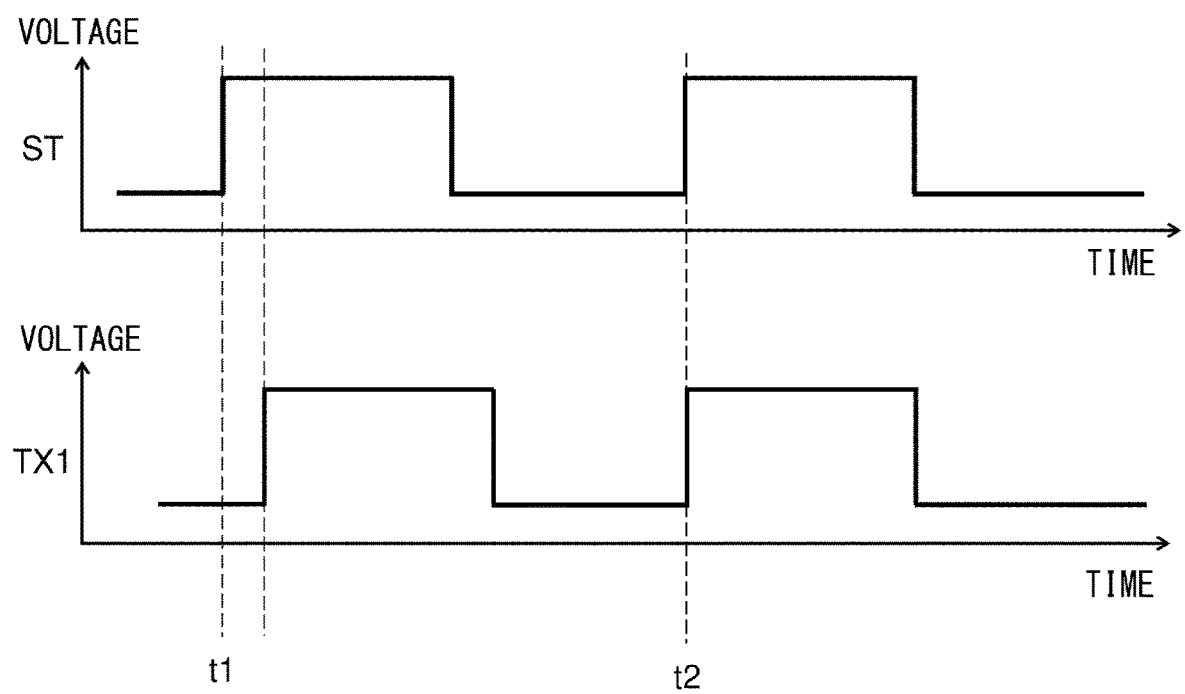
FIG. 12 is a graph illustrating exemplary waveforms of a timing signal and a first touch drive signal of the display system in FIG. 11.

FIG. 12 illustrates exemplary waveforms of the timing signal ST and the first touch drive signal TX1 of the display system 1 in FIG. 11. While there is a phase difference at time t1, which is immediately after a startup of the display system 1, for example, the phase difference is corrected to substantially zero at time t2.

According to the present embodiment, the phase difference can be made smaller even in a case where a phase difference is generated between the first touch drive signal TX1 and the second touch drive signal TX2 due to, for example, a difference in electrical characteristics between the first drive circuit 74a and the second drive circuit 74b. Accordingly, even in such a case, it becomes possible to suppress erroneous detection near the boundary between the first display device 22a and the second display device 22b. Since it is permissible if there is a difference in temperature on the rear side of the two display modules 20, it becomes possible to reduce restrictions on the arrangement position of the display modules 20.

Note that, although it is assumed that the wiring delay of the timing signal ST is small enough not to substantially affect the phase difference in the descriptions above, if the wiring delay of the timing signal ST is relatively large, a delay time may be calculated in advance on the basis of the wiring length and the acquirer 90 may retain the delay time. The acquirer 90 corrects the phase of the timing signal ST supplied from the second display control device 24b using the delay time to acquire a phase difference excluding the wiring delay. In this case, although there is also a wiring delay of the synchronization signal SY, the phase of the timing signal ST includes the wiring delay of the synchronization signal SY as well, and thus the influence of the wiring delay of the synchronization signal SY can also be corrected.

Third Embodiment

In a similar manner to the second embodiment, a third embodiment also deals with a situation where a phase difference between a first touch drive signal TX1 and a second touch drive signal TX2 becomes large. The third embodiment is different from the first embodiment in that an integration period of a touch detection signal RX is made longer. In the following, description will be given mainly for the differences from the first embodiment.

Figure 13:
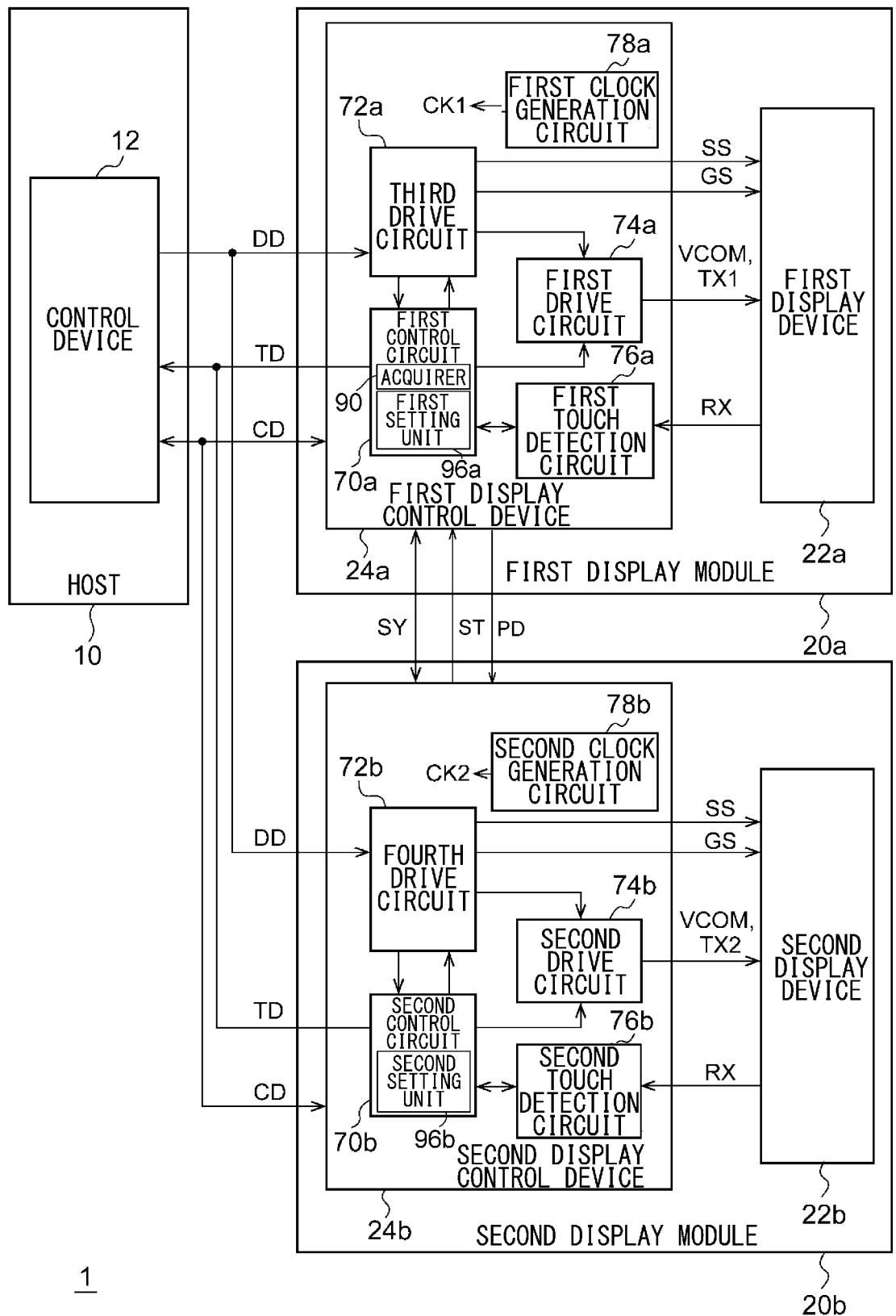
FIG. 13 is a block diagram of a display system according to a third embodiment.

FIG. 13 is a block diagram of a display system 1 according to a third embodiment. In a similar manner to the second embodiment, a second display control device 24b supplies a timing signal ST to a first display control device 24a.

A first control circuit 70a includes an acquirer 90 and a first setting unit 96a. In a similar manner to the second embodiment, the acquirer 90 acquires a phase difference between the first touch drive signal TX1 and the second touch drive signal TX2. The phase difference also indicates which phase of the first touch drive signal TX1 or the second touch drive signal TX2 is advanced. The acquirer 90 notifies the second display control device 24b of the phase difference using phase difference data PD.

The first setting unit 96a sets a first period and a third period, which are integration periods, on the basis of the phase difference acquired by the acquirer 90, and controls a first touch detection circuit 76a on the basis of the set first period and the third period.

The first setting unit 96a derives an integration time by adding a reference time to the time corresponding to the phase difference. The reference time is a time in which, in the first embodiment, the touch detection circuit 76 performs one integration. The reference time is longer than the time from the rise timing of the first touch drive signal TX1 to the timing at which the charging current flowing through the parasitic capacitance with respect to the ground potential of a common electrode 34 becomes zero, by a predetermined time. The predetermined time may be appropriately set according to experiments or simulations such that the desired touch detection performance can be obtained.

When the phase of the first touch drive signal TX1 is advanced, the first setting unit 96a sets a first period from the rise timing of the first touch drive signal TX1 to the timing at which the integration time has elapsed, and sets a third period from the fall timing of the first touch drive signal TX1 to the timing at which the integration time has elapsed.

When the phase of the second touch drive signal TX2 is advanced, the first setting unit 96a sets a first period, which is from the timing earlier than the rise timing of the first touch drive signal TX1 by the time corresponding to the phase difference to the timing at which the integration time has elapsed, and sets a third period, which is from the timing earlier than the fall timing of the first touch drive signal TX1 by the time corresponding to the phase difference to the timing at which the integration time has elapsed.

The first touch detection circuit 76a integrates the touch detection signal RX to obtain an integrated value during the first period, integrates the touch detection signal RX to obtain an integrated value during the third period, and repeats those processes. The first touch detection circuit 76a may perform integration during either the first period or the third period.

A second control circuit 70b includes a second setting unit 96b. The second setting unit 96b sets a second period and a fourth period, which are integration periods, on the basis of the phase difference notified from the acquirer 90, and controls a second touch detection circuit 76b on the basis of the set second period and the fourth period.

The second setting unit 96b derives an integration time by adding a reference time to the time corresponding to the phase difference. Since the integration time is equal to the integration time derived by the first setting unit 96a, the integration time may be notified from the first setting unit 96a.

When the phase of the first touch drive signal TX1 is advanced, the second setting unit 96b sets a second period, which is from the timing earlier than the rise timing of the second touch drive signal TX2 by the time corresponding to the phase difference to the timing at which the integration time has elapsed, and sets a fourth period, which is from the timing earlier than the fall timing of the second touch drive signal TX2 by the time corresponding to the phase difference to the timing at which the integration time has elapsed.

When the phase of the second touch drive signal TX2 is advanced, the second setting unit 96b sets a second period from the rise timing of the second touch drive signal TX2 to the timing at which the integration time has elapsed, and sets a fourth period from the fall timing of the second touch drive signal TX2 to the timing at which the integration time has elapsed.

The second touch detection circuit 76b integrates the touch detection signal RX to obtain an integrated value during the second period, integrates the touch detection signal RX to obtain an integrated value during the fourth period, and repeats those processes. The second touch detection circuit 76b may perform integration during either the second period or the fourth period.

The acquirer 90, the first setting unit 96a, and the second setting unit 96b periodically execute the process described above at a predetermined frequency. Accordingly, it becomes possible to set the integration period according to the phase difference even if the phase difference changes due to a change in temperature or the like. Since it is possible to set the integration period not to be longer than necessary, fluctuations in the integrated value due to external noise can be suppressed.

Figure 14:
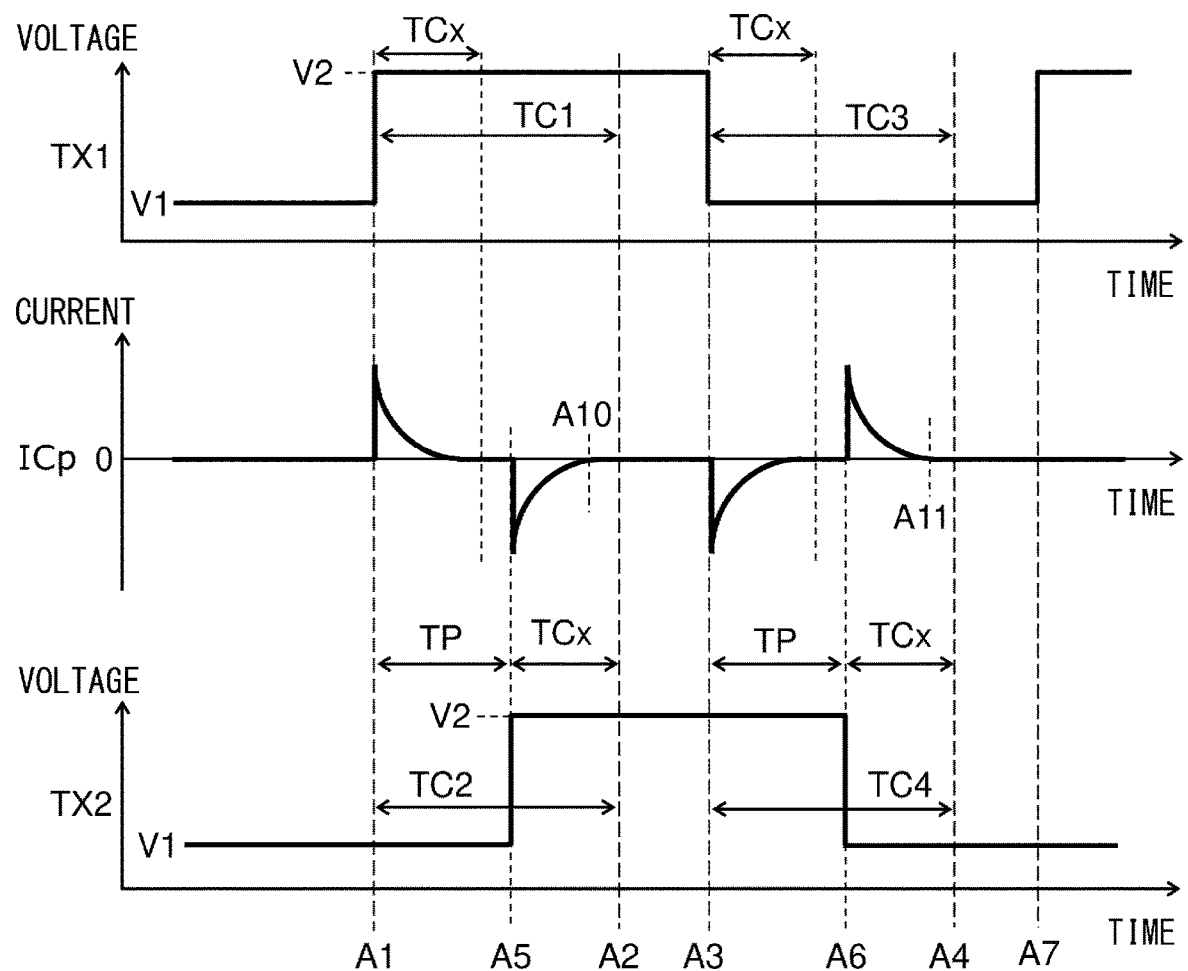
FIG. 14 is a graph illustrating exemplary waveforms of a first touch drive signal, a second touch drive signal, and a current according to the third embodiment.

FIG. 14 illustrates exemplary waveforms of the first touch drive signal TX1, the second touch drive signal TX2, and a current ICp according to the third embodiment. A phase difference is generated between the first touch drive signal TX1 and the second touch drive signal TX2 due to a difference in electrical characteristics between the first drive circuit 74a and the second drive circuit 74b, a wiring delay, and the like. In this example, the phase of the first touch drive signal TX1 is advanced compared with that of the second touch drive signal TX2.

Each of the first touch drive signal TX1 and the second touch drive signal TX2 changes between a first voltage V1 and a second voltage V2. The first voltage V1 is at a low level and the second voltage V2 is at a high level higher than the first voltage V1 here, or vice versa.

A first period TC1 is a period from a rise timing A1 of the first touch drive signal TX1 to a timing A2 at which the integration time has elapsed. The length of the first period TC1 is the sum of a time TP corresponding to the phase difference and a reference time TCx. That is, it can be said that the integration period in the first embodiment is extended backward by the time TP corresponding to the phase difference. The minimum first period TC1 is from the timing A1 until the reference time TCx elapses, and the maximum first period TC1 is from the timing A1 to immediately before a timing A3.

A third period TC3 is a period from a fall timing A3 of the first touch drive signal TX1 to a timing A4 at which the integration time has elapsed. The length of the third period TC3 is also the sum of a time TP corresponding to the phase difference and the reference time TCx. The minimum third period TC3 is from the timing A3 until the reference time TCx elapses, and the maximum third period TC3 is from the timing A3 to immediately before a timing A7. The first period TC1 and the third period TC3 do not overlap.

A second period TC2 is a period from the timing A1, which is earlier than a rise timing A5 of the second touch drive signal TX2 by the time TP corresponding to the phase difference, to the timing A2 at which the integration time has elapsed. That is, it can be said that the integration period in the first embodiment is extended forward by the time TP corresponding to the phase difference. The minimum second period TC2 is from the timing A5 to the timing A2, and the maximum second period TC2 is from immediately after the end timing (not illustrated) of the immediately preceding fourth period TC4 to the timing A2. In this example, the first period TC1 and the second period TC2 are equal.

A fourth period TC4 is a period from the timing A3, which is earlier than a fall timing A6 of the second touch drive signal TX2 by the time TP corresponding to the phase difference, to the timing A4 at which the integration time has elapsed. The minimum fourth period TC4 is from the timing A6 to the timing A4, and the maximum fourth period TC4 is from immediately after the timing A2 to the timing A4. In this example, the third period TC3 and the fourth period TC4 are equal. The second period TC2 and the fourth period TC4 do not overlap.

Each of the first period TC1 and the second period TC2 includes a period from the first timing A1 to a second timing A10. Each of the third period TC3 and the fourth period TC4 includes a period from the third timing A3 to a fourth timing A1l. As long as those conditions are satisfied, the first period TC1 and the second period TC2 may be different, and the third period TC3 and the fourth period TC4 may be different.

The first timing A1 is a timing at which, of the first touch drive signal TX1 or the second touch drive signal TX2, the one whose phase is advanced changes from the first voltage V1 to the second voltage V2.

The second timing A10 is a timing at which the current ICp flowing between the common electrode 34 of a first display device 22a and the common electrode 34 of a second display device 22b, which are adjacent to each other, becomes zero, the current flowing due to the situation where, of the first touch drive signal TX1 and the second touch drive signal TX2, the one whose phase is delayed changes from the first voltage V1 to the second voltage V2. The time from the timing A5 to the second timing A10 is called a current convergence time of the current ICp.

The third timing A3 is a timing at which, of the first touch drive signal TX1 or the second touch drive signal TX2, the one whose phase is advanced changes from the second voltage V2 to the first voltage V1.

The fourth timing A11 is a timing at which the current ICp flowing between the common electrode 34 of the first display device 22a and the common electrode 34 of the second display device 22b, which are adjacent to each other, becomes zero, the current flowing due to the situation where, of the first touch drive signal TX1 and the second touch drive signal TX2, the one whose phase is delayed changes from the second voltage V2 to the first voltage V1.

Both charging and discharging for the parasitic capacitance Cp between the common electrode 34 of the first display device 22a and the common electrode 34 of the second display device 22b, which are adjacent to each other, are performed in each of the first period TC1, the second period TC2, the third period TC3, and the fourth period TC4. As a result, the influence of the charging and discharging on the parasitic capacitance Cp can be canceled in the integrated value. This is because the charge amount and the discharge amount for the parasitic capacitance Cp are substantially the same. Accordingly, it becomes possible to suppress erroneous detection of a touch near the boundary between the first display device 22a and the second display device 22b even in a case where there is a phase difference.

The timing A5 at which, of the first touch drive signal TX1 and the second touch drive signal TX2, the one whose phase is delayed changes from the first voltage V1 to the second voltage V2 and the second timing A10 are located between the first timing A1 and the timing A3 at which, of the first touch drive signal TX1 and the second touch drive signal TX2, the one whose phase is advanced changes from the second voltage V2 to the first voltage V1.

The timing A6 at which, of the first touch drive signal TX1 and the second touch drive signal TX2, the one whose phase is delayed changes from the second voltage V2 to the first voltage V1 and the fourth timing A1l are located between the third timing A3 and the timing A7 at which, of the first touch drive signal TX1 and the second touch drive signal TX2, the one whose phase is advanced changes from the first voltage V1 to the second voltage V2.

Therefore, the current ICp flowing through the parasitic capacitance Cp caused by the situation where, of the first touch drive signal TX1 and the second touch drive signal TX2, the one whose phase is advanced changes from the second voltage V2 to the first voltage V1 does not affect the integrated value of each of the first period TC1 and the second period TC2. Furthermore, the current ICp flowing through the parasitic capacitance Cp caused by the situation where, of the first touch drive signal TX1 and the second touch drive signal TX2, the one whose phase is advanced changes from the first voltage V1 to the second voltage V2 does not affect the integrated value of each of the third period TC3 and the fourth period TC4. Therefore, the influence of the charging and discharging on the parasitic capacitance Cp can be more reliably canceled in the integrated value.

Figure 15:
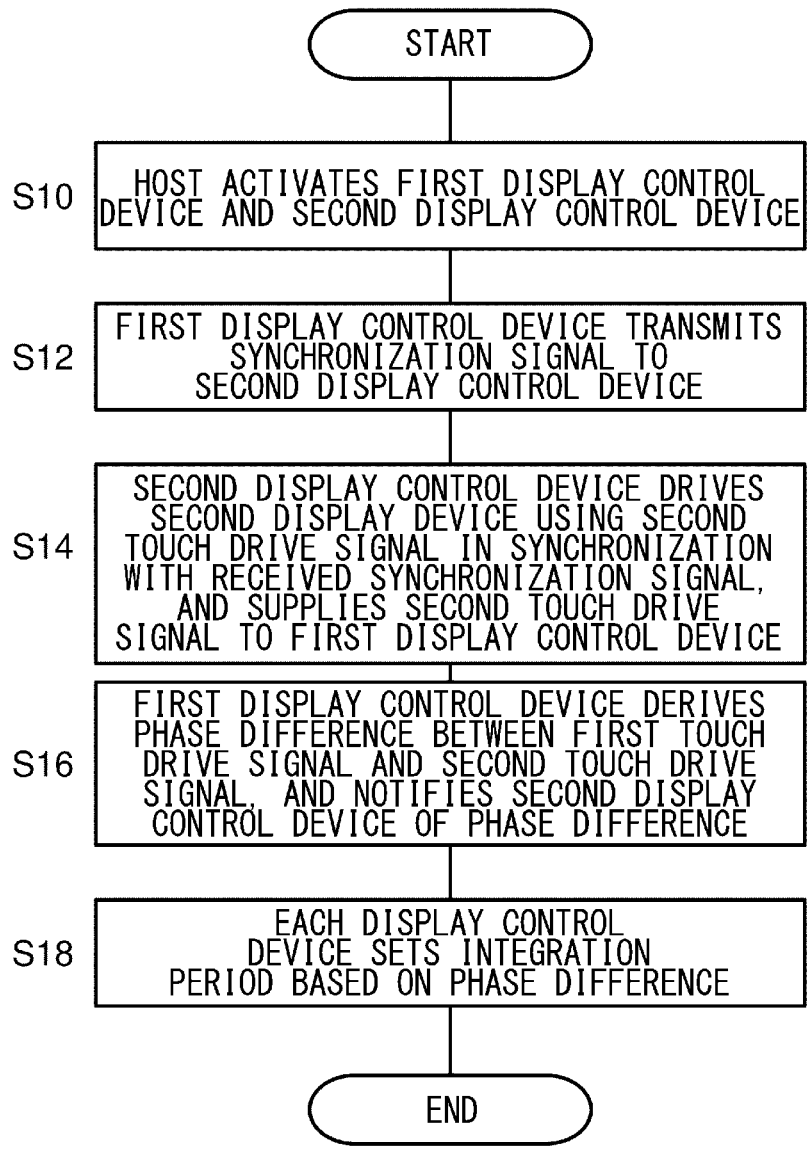
FIG. 15 is a flowchart illustrating a startup process performed in the display system in FIG. 13.

There will now be described the overall operation of the display system 1 having the configuration set forth above. FIG. 15 is a flowchart illustrating a startup process performed in the display system 1 in FIG. 13. A host 10 activates the first display control device 24a and the second display control device 24b (S10), and the first display control device 24a transmits a synchronization signal SY to the second display control device 24b (S12). The second display control device 24b drives the second display device 22b using a second touch drive signal TX2 in synchronization with the received synchronization signal SY, and supplies the second touch drive signal TX2 to the first display control device 24a (S14). The first display control device 24a derives a phase difference between the first touch drive signal TX1 and the second touch drive signal TX2, and notifies the second display control device 24b of the phase difference (S16). Each of the display control devices 24 sets an integration period on the basis of the phase difference (S18), and the process is terminated.

According to the present embodiment, even in a case where a phase difference is generated between the first touch drive signal TX1 and the second touch drive signal TX2, erroneous detection of a touch can be suppressed near the boundary between the first display device 22a and the second display device 22b. In addition, it is sufficient if the integration period is changed according to the first embodiment, whereby the design is facilitated.

First Variation of Third Embodiment

In a first variation, the first period TC1 and the second period TC2 are different, and the third period TC3 and the fourth period TC4 are different. In a case where the phase of the first touch drive signal TX1 is advanced, while the operation of the second setting unit 96b is as described above, the first setting unit 96a derives an integration time by adding the current convergence time of the current ICp to the time TP corresponding to the phase difference when the sum of the time TP corresponding to the phase difference and the current convergence time is equal to or longer than the reference time TCx. When the phase difference is small and the sum of the time TP corresponding to the phase difference and the current convergence time is shorter than the reference time TCx, the first setting unit 96a sets the reference time TCx as the integration time. Since the current convergence time is shorter than the reference time TCx, in a case where the sum of the time TP corresponding to the phase difference and the current convergence time is longer than the reference time TCx, the first period TC1 is shorter than the second period TC2, and the third period TC3 is shorter than the fourth period TC4. In this case, the integration period in the first touch detection circuit 76a can be shortened, whereby fluctuations in the integrated value due to external noise can be suppressed.

Similarly, in a case where the phase of the second touch drive signal TX2 is advanced, while the operation of the first setting unit 96a is as described above, the second setting unit 96b derives an integration time by adding the current convergence time to the time TP corresponding to the phase difference when the sum of the time TP corresponding to the phase difference and the current convergence time is equal to or longer than the reference time TCx. When the sum of the time TP corresponding to the phase difference and the current convergence time is shorter than the reference time TCx, the reference time TCx is set as the integration time. When the sum of the time TP corresponding to the phase difference and the current convergence time is longer than the reference time TCx, the second period TC2 is shorter than the first period TC1, and the fourth period TC4 is shorter than the third period TC3. In this case, the integration period in the second touch detection circuit 76b can be shortened, whereby fluctuations in the integrated value due to external noise can be suppressed.

Second Variation of Third Embodiment

Only in a first touch detection period T4a in which the first touch detection circuit 76a detects a touch in a first touch detection area R1a adjacent to the second display device 22b, the first setting unit 96a may set the first period TC1 and the third period TC3 on the basis of the phase difference. In the other first touch detection periods T1a to T3a, the first setting unit 96a may set the first period TC1 from the rise timing A1 of the first touch drive signal TX1 to the timing at which the reference time TCx has elapsed, and may set the third period TC3 from the fall timing A3 of the first touch drive signal TX1 to the timing at which the reference time TCx has elapsed. That is, in the first touch detection periods T1a to T3a, integration is performed for the period same as in the first embodiment.

Similarly, only in a second touch detection period T1b in which the second touch detection circuit 76b detects a touch in a second touch detection area R1b adjacent to the first display device 22a, the second setting unit 96b may set the second period TC2 and the fourth period TC4 on the basis of the phase difference. In the other second touch detection periods T2b to T4b, the second setting unit 96b may set the second period TC2 from the rise timing A5 of the second touch drive signal TX2 to the timing A2 at which the reference time TCx has elapsed, and may set the fourth period TC4 from the fall timing A6 of the second touch drive signal TX2 to the timing A4 at which the reference time TCx has elapsed. That is, in the second touch detection periods T2b to T4b, integration processing same as in the first embodiment is performed.

In this variation, the integration period can be shortened except for the touch detection area adjacent to the adjacent display device 22, whereby fluctuations in the integrated value due to external noise can be suppressed.

Third Variation of Third Embodiment

In a case where the maximum value of the phase difference due to a change in temperature or the like can be obtained in advance according to experiments or simulations, the first setting unit 96a may set the first period TC1 and the third period TC3 on the basis of the maximum value of the phase difference. The same applies to the second setting unit 96b. The first period TC1 to the fourth period TC4 are fixed values. In this variation, it is not required to periodically acquire the phase difference and set the first period TC1 and the like, whereby the process can be simplified. The wiring for transmitting the timing signal ST and the phase difference data PD can also be eliminated.

In addition, in a case where the maximum value of the phase difference is unknown, each of the first period TC1 to the fourth period TC4 may be set to the maximum in advance if the touch drive signal whose phase is advanced is known. In this case, the design is facilitated.

Fourth Embodiment

A fourth embodiment is different from the first embodiment in that a control device 12 of a host 10 transmits a synchronization signal SY to a first display device 22a and a second display device 22b. In the following, description will be given mainly for the differences from the first embodiment.

Figure 16:
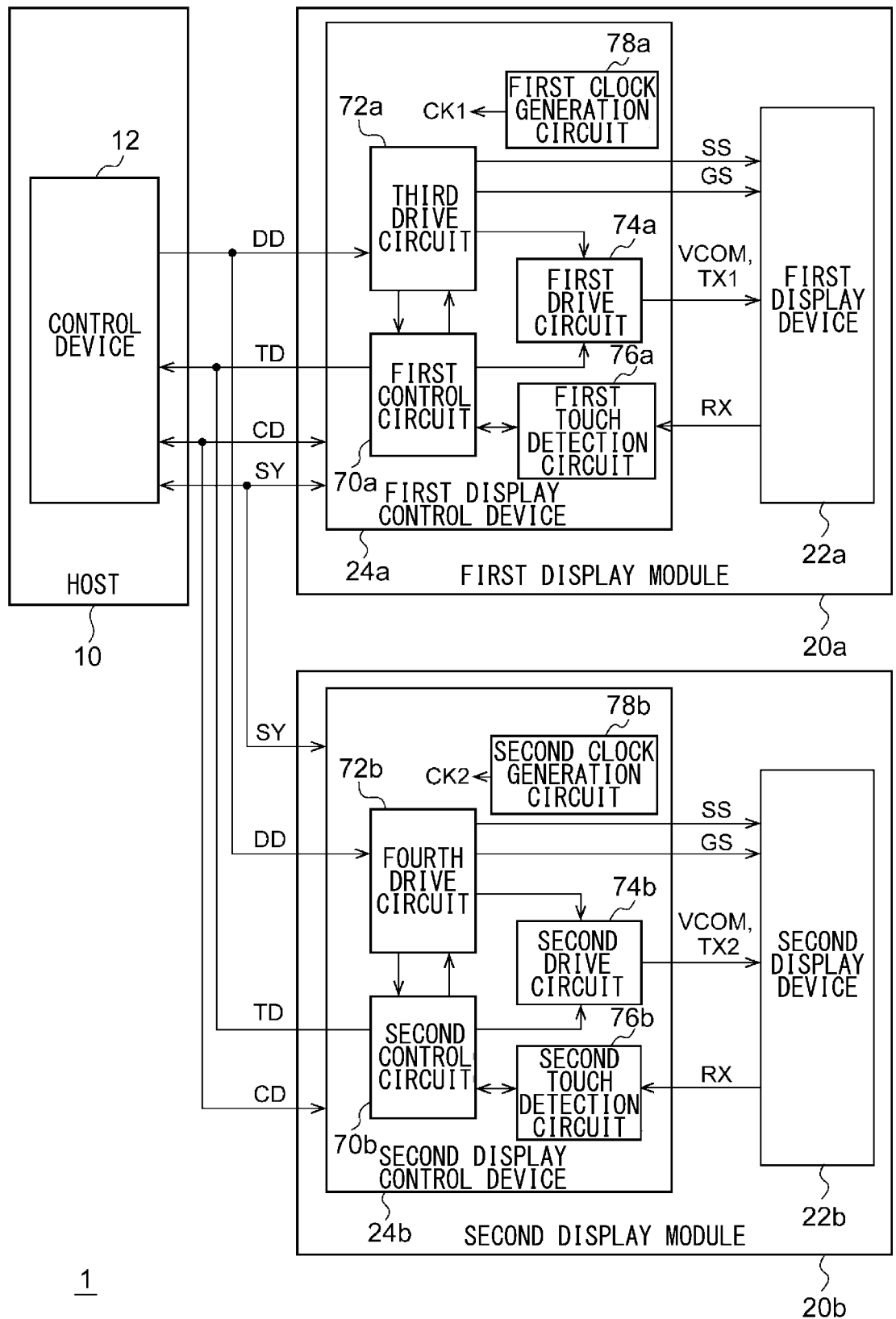
FIG. 16 is a block diagram of a display system according to a fourth embodiment.

FIG. 16 is a block diagram of a display system 1 according to the fourth embodiment. The control device 12 transmits, for example, a common synchronization signal SY to a first display control device 24a and a second display control device 24b at each start timing of a first frame period. The first display control device 24a does not transmit a synchronization signal to the second display control device 24b.

A first clock generation circuit 78a generates a first reference clock signal CK1 in synchronization with the synchronization signal SY on the basis of the synchronization signal SY supplied from the control device 12. A second clock generation circuit 78b generates a second reference clock signal CK2 in synchronization with the synchronization signal SY on the basis of the synchronization signal SY supplied from the control device 12. Even in this manner, a first touch drive signal TX1 and a second touch drive signal TX2 having the same phase can be generated.

According to the present embodiment, it becomes possible to improve flexibility in the configuration of the display system 1.

First Variation of Fourth Embodiment

The second embodiment may be combined with the fourth embodiment. In this case, the first display control device 24a supplies a first timing signal to the control device 12. The second display control device 24b supplies a second timing signal to the control device 12. Instead of a first control circuit 70a, the control device 12 includes an acquirer 90 and a controller 92.

The acquirer 90 acquires a phase difference between the first touch drive signal TX1 and the second touch drive signal TX2 on the basis of the supplied first timing signal and the second timing signal.

The controller 92 controls the phase of the first touch drive signal TX1 in such a manner that the phase difference acquired by the acquirer 90 approaches zero. For example, the controller 92 supplies the phase difference to the first display control device 24a, and the first drive circuit 74a generates the first touch drive signal TX1 in phase with the second touch drive signal TX2 on the basis of the phase difference. The controller 92 may control the phase of the second touch drive signal TX2.

Alternatively, the controller 92 generates a first synchronization signal and a second synchronization signal having the acquired phase difference, supplies the first synchronization signal to the first display control device 24a, and supplies the second synchronization signal to the second display control device 24b.

This variation exerts effects of each of the second and fourth embodiments.

Second Variation of Fourth Embodiment

The third embodiment may be combined with the fourth embodiment. In this case, the first display control device 24a supplies a first timing signal to the control device 12. The second display control device 24b supplies a second timing signal to the control device 12. Instead of the first control circuit 70a, the control device 12 includes the acquirer 90.

The acquirer 90 acquires a phase difference between the first touch drive signal TX1 and the second touch drive signal TX2 on the basis of the supplied first timing signal and the second timing signal, and supplies the acquired phase difference to the first display control device 24a and the second display control device 24b. The process same as in the third embodiment is executed in a first setting unit 96a and a second setting unit 96b.

Figure 17:
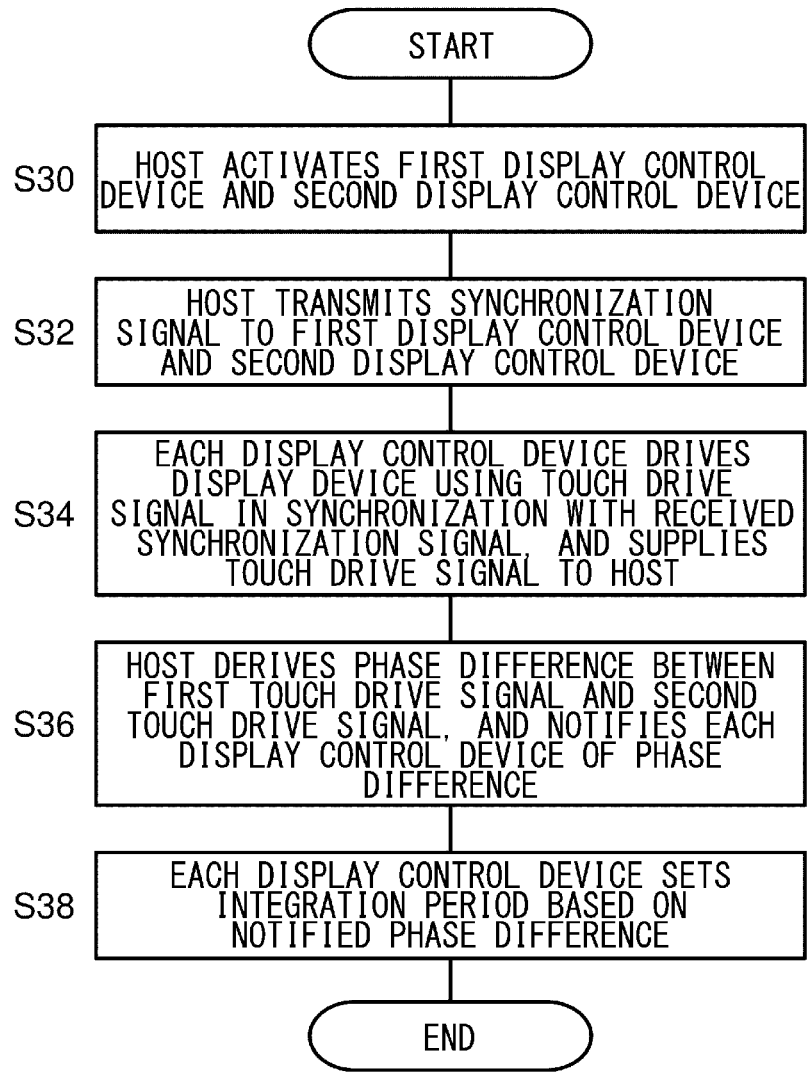
FIG. 17 is a flowchart illustrating a startup process performed in a display system according to a second variation of the fourth embodiment.

FIG. 17 is a flowchart illustrating a startup process performed in the display system 1 according to the second variation of the fourth embodiment. The host 10 activates the first display control device 24a and the second display control device 24b (S30), and transmits a synchronization signal SY to the first display control device 24a and the second display control device 24b (S32). Each of the display control devices 24 drives the display device 22 using a touch drive signal in synchronization with the received synchronization signal SY, and supplies the touch drive signal to the host 10 (S34). The host 10 derives a phase difference between the first touch drive signal TX1 and the second touch drive signal TX2, and notifies each of the display control devices 24 of the phase difference (S36). Each of the display control devices 24 sets an integration period on the basis of the notified phase difference (S38), and the process is terminated.

This variation exerts effects of each of the third and fourth embodiments.

Fifth Embodiment

In a fifth embodiment, a method of changing a frequency of a touch drive signal TX will be described to relieve the influence of external noise. Hereinafter, descriptions of the points that overlap with the contents described in the first embodiment will be omitted.

In a case where the frequency of the external noise radiated from, for example, electronic devices around a display system 1 is equal to the frequency of a touch drive signal TX, accuracy and sensitivity of touch detection may be deteriorated. In view of the above, the display system 1 performs control to change the frequency of the touch drive signal TX (what is called frequency-hopping control) depending on the amount of the external noise. Well-known techniques may be used for the frequency-hopping.

A first control circuit 70a of a first display control device 24a controls a first drive circuit 74a such that the frequency of a first touch drive signal TX1 is changed. Then, the first control circuit 70a outputs, to a second control circuit 70b of a second display control device 24b, a frequency change instruction including information associated with the frequency of the first touch drive signal TX1 after the change.

The second control circuit 70b controls a second drive circuit 74b such that the frequency of a second touch drive signal TX2 is changed on the basis of the frequency change instruction obtained from the first control circuit 70a. Specifically, the second control circuit 70b causes the second drive circuit 74b to change the frequency of the second touch drive signal TX2 to be the frequency same as that of the first touch drive signal TX1 after the change.

The second control circuit 70b of the second display control device 24b controls the second drive circuit 74b such that the frequency of the second touch drive signal TX2 is changed. Then, to the first control circuit 70a of the first display control device 24a, a frequency change instruction including information associated with the frequency of the second touch drive signal TX2 after the change is output.

The first control circuit 70a controls the first drive circuit 74a such that the frequency of the first touch drive signal TX1 is changed on the basis of the frequency change instruction obtained from the second control circuit 70b. Specifically, the first control circuit 70a causes the first control circuit 70a to change the frequency of the first touch drive signal TX1 to be the frequency same as that of the second touch drive signal TX2 after the change.

First Variation of Fifth Embodiment

The first control circuit 70a and the second control circuit 70b may each transmit the frequency change instruction to each other via a host 10.

The first control circuit 70a transmits, to the host 10, a frequency change instruction including information associated with the frequency of the first touch drive signal TX1 after the change. The host 10 transmits, to the second control circuit 70b, the frequency change instruction obtained from the first control circuit 70a. The second control circuit 70b controls the second drive circuit 74b such that the frequency of the second touch drive signal TX2 is changed on the basis of the frequency change instruction obtained from the host 10.

The second control circuit 70b transmits, to the host 10, a frequency change instruction including information associated with the frequency of the second touch drive signal TX2 after the change. The host 10 transmits, to the first control circuit 70a, the frequency change instruction obtained from the second control circuit 70b. The first control circuit 70a controls the first drive circuit 74a such that the frequency of the first touch drive signal TX1 is changed on the basis of the frequency change instruction obtained from the host 10.

Second Variation of Fifth Embodiment

The host 10 may generate a frequency change instruction and transmit it to each of the first control circuit 70a and the second control circuit 70b.

Sixth Embodiment

In a sixth embodiment, there will be described synchronous control in the case where startup timings of a first display module 20a and a second display module 20b are different. Hereinafter, descriptions of the points that overlap with the contents described in the first embodiment will be omitted.

Figure 18:
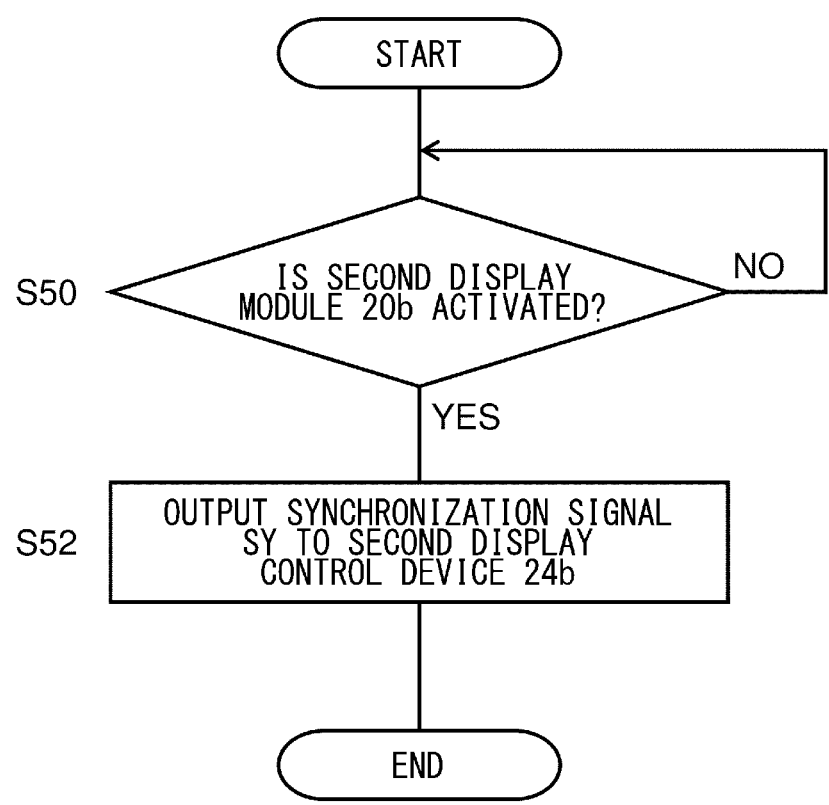
FIG. 18 is a flowchart illustrating an output process of a synchronization signal of a first display control device according to a sixth embodiment.

FIG. 18 is a flowchart illustrating an output process of a synchronization signal SY performed in a first display control device 24a. In a state where the second display module 20b is activated (YES in S50), the first display control device 24a outputs a synchronization signal SY to a second display control device 24b (S52). On the other hand, when the second display module 20b is not in the activated state (NO in S50), the first display control device 24a repeats the determination processing in step S50. The first display control device 24a may obtain information associated with the activation state of the second display module 20b from the second display module 20b or from a host 10.

Note that, in a similar manner to the first display control device 24a, the second display control device 24b may be configured to have a function of generating the synchronization signal SY in a second clock generation circuit 78b, and the second display control device 24b may perform the process illustrated in FIG. 18.

Seventh Embodiment

A seventh embodiment is different from the fourth embodiment in that a display system 1 includes a host 10a and a host 10b and the host 10a and the host 10b control a first display module 20a and a second display module 20b, respectively. In the following, description will be given mainly for the differences from the fourth embodiment.

Figure 19:
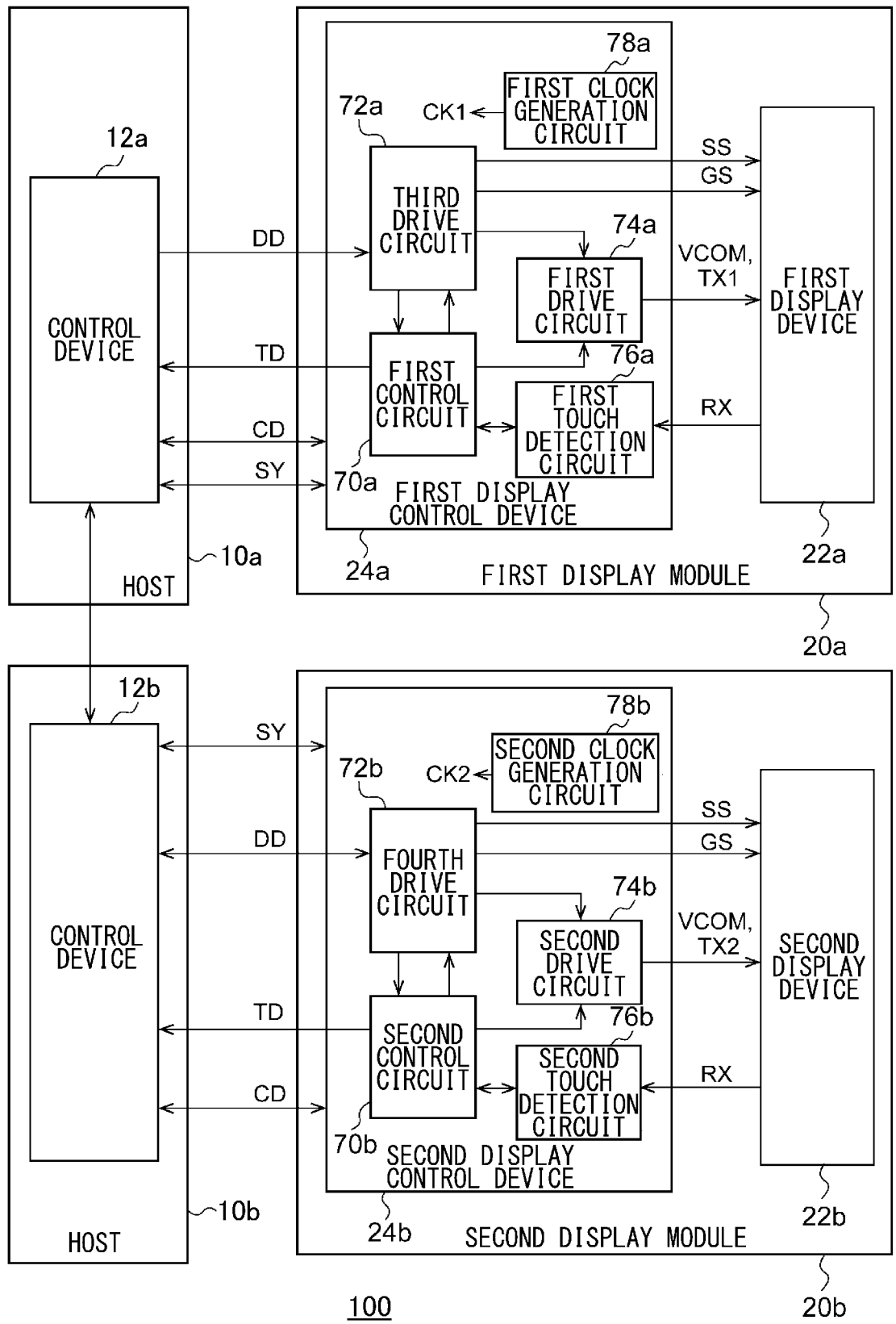
FIG. 19 is a block diagram of a display system according to a seventh embodiment.

FIG. 19 is a block diagram of a display system 100 according to the seventh embodiment. The display system 100 includes the host 10a, the host 10b, the first display module 20a, and the second display module 20b.

The host 10a includes a control device 12a, and controls the first display module 20a. The host 10a is arranged on a substrate different from the first display module 20a, for example.

The host 10b includes a control device 12b, and controls the second display module 20b. The host 10b is arranged on a substrate different from the second display module 20b, for example.

The control device 12a may be a CPU, for example, and also called a host CPU. The control device 12a supplies image data DD and control data CD to the first display module 20a, and controls the first display module 20a on the basis of such data.

The control device 12b may be a CPU, for example, and also called a host CPU. The control device 12b supplies image data DD and control data CD to the second display module 20b, and controls the second display module 20b on the basis of such data.

The control device 12a transmits, for example, a synchronization signal SY to a first display control device 24a at each start timing of a first frame period. The control device 12a further transmits a synchronization signal SY to the control device 12b at a predetermined timing. The control device 12b transmits the received synchronization signal SY to a second display control device 24b.

A first clock generation circuit 78a generates a first reference clock signal CK1 in synchronization with the synchronization signal SY on the basis of the synchronization signal SY supplied from the control device 12a. A second clock generation circuit 78b generates a second reference clock signal CK2 in synchronization with the synchronization signal SY on the basis of the synchronization signal SY supplied from the control device 12b. According to the present embodiment, it becomes possible to improve flexibility in the configuration of the display system 100.

Like the display system 100 according to the seventh embodiment, the display system 1 according to the first to third embodiments described above may include a host 10a and a host 10b, and the host 10a and the host 10b may control a first display module 20a and a second display module 20b, respectively.

Like the display system 100 according to the seventh embodiment, the display system 1 according to the fifth embodiment described above may include a host 10a and a host 10b, and the host 10a and the host 10b may control a first display module 20a and a second display module 20b, respectively. Further, one of the host 10a and the host 10b may transmit a frequency change instruction of the touch drive signal TX to the other, and the host 10a and the host 10b may transmit the frequency change instruction to the first display control device 24a and the second display control device 24b, respectively.

Like the display system 100 according to the seventh embodiment, the display system 1 according to the sixth embodiment described above may include a host 10a and a host 10b, and the host 10a and the host 10b may control a first display module 20a and a second display module 20b, respectively. Further, the host 10a may transmit information associated with the activation state of the first display module 20a to the host 10b, and the host 10b may transmit the information to the second display module 20b. The host 10b may transmit information associated with the activation state of the second display module 20b to the host 10a, and the host 10a may transmit the information to the first display module 20a.

The present disclosure has been described with reference to embodiments. The embodiments are intended to be illustrative only, and it will be obvious to those skilled in the art that various modifications to a combination of constituting elements or processes in the embodiments could be developed and that such modifications also fall within the scope of the present disclosure.

For example, in the first to third embodiments, the synchronization signal SY output from the first display control device 24a may be input to the control device 12 of the host 10, and a buffer circuit (not illustrated) of the control device 12 may buffer the input synchronization signal SY and supplies the buffered synchronization signal SY to the second display control device 24b. In this variation, the amplitude of the synchronization signal SY can be maintained even in a case where the wiring of the synchronization signal SY is relatively long.

Furthermore, three or more display devices 22 may be arranged to be adjacent to each other. Although the display control device 24 is included in the display module 20 in the embodiments, the display control device 24 may be included in the host 10. The number of touch detection periods included in a frame period may be more than twice the number of touch detection areas of the display device 22. Those variations allow greater flexibility in the configuration of the display system 1.

Although the in-cell display device 22 has been described, the display device 22 may be an out-cell type. In this case, the display device 22 includes a sensor electrode dedicated to touch detection, and detects a touch by a self-capacitance method using the sensor electrode in parallel with image display. Even in the case of the out-cell display device 22, erroneous detection of a touch near the boundary between the two display devices 22 can be suppressed.

A display system according to one aspect of the present disclosure includes:

a first display device including a plurality of first sensor electrodes;

a second display device that is arranged adjacent to the first display device and including a plurality of second sensor electrodes;

a first drive circuit that supplies a first touch drive signal to the plurality of first sensor electrodes;

a second drive circuit that supplies a second touch drive signal to the plurality of second sensor electrodes, the second touch drive signal having a frequency same as a frequency of the first touch drive signal and being in phase with the first touch drive signal;

a first touch detection circuit that detects a touch by an object on the first display device on the basis of a touch detection signal received from each of the plurality of first sensor electrodes; and a second touch detection circuit that detects a touch by an object on the second display device on the basis of a touch detection signal received from each of the plurality of second sensor electrodes.

According to this aspect, it becomes possible to suppress erroneous detection of a touch near the boundary between the first display device and the second display device.

It is also possible that, for example, the display system according to one aspect of the present disclosure includes:

a first clock generation circuit that generates a first reference clock signal and a synchronization signal in synchronization with the first reference clock signal; and a second clock generation circuit that generates a second reference clock signal in synchronization with the synchronization signal generated by the first clock generation circuit, in which the first drive circuit generates the first touch drive signal in synchronization with the first reference clock signal, and the second drive circuit generates the second touch drive signal in synchronization with the second reference clock signal.

In this case, the first touch drive signal can be made in phase with the second touch drive signal.

It is also possible that, for example, the display system according to one aspect of the present disclosure includes:

a control device that outputs a synchronization signal;

a first clock generation circuit that generates a first reference clock signal in synchronization with the synchronization signal output from the control device; and a second clock generation circuit that generates a second reference clock signal in synchronization with the synchronization signal output from the control device, in which the first drive circuit generates the first touch drive signal in synchronization with the first reference clock signal, and the second drive circuit generates the second touch drive signal in synchronization with the second reference clock signal.

In this case, the first touch drive signal can be made in phase with the second touch drive signal.

It is also possible that, for example, the display system according to one aspect of the present disclosure includes:

an acquirer that acquires a phase difference between the first touch drive signal and the second touch drive signal; and a controller that controls a phase of the first touch drive signal or the second touch drive signal such that the phase difference acquired by the acquirer approaches zero.

In this case, the phase difference can be made smaller even in a case where a phase difference is generated between the first touch drive signal and the second touch drive signal due to, for example, a difference in electrical characteristics between the first drive circuit and the second drive circuit. Accordingly, it becomes possible to suppress erroneous detection near the boundary between the first display device and the second display device.

The display system according to one aspect of the present disclosure may be configured as follows, for example:

each of the first touch drive signal and the second touch drive signal changes between a first voltage and a second voltage, the first touch detection circuit integrates the touch detection signal received from each of the plurality of first sensor electrodes during a first period, and detects a touch by an object on the first display device on the basis of an integrated value, the second touch detection circuit integrates the touch detection signal received from each of the plurality of second sensor electrodes during a second period, and detects a touch by an object on the second display device on the basis of an integrated value, each of the first period and the second period includes a period from a first timing at which, of the first touch drive signal and the second touch drive signal, the one whose phase is advanced changes from the first voltage to the second voltage to a second timing, and the second timing is a timing at which a current flowing between the first sensor electrode of the first display device and the second sensor electrode of the second display device, which are adjacent to each other, becomes zero, the current flowing due to a situation where, of the first touch drive signal and the second touch drive signal, the one whose phase is delayed changes from the first voltage to the second voltage.

In this case, erroneous detection near the boundary between the first display device and the second display device can be suppressed even in a case where a phase difference is generated between the first touch drive signal and the second touch drive signal due to, for example, a difference in characteristics between the first drive circuit and the second drive circuit.

It is also possible that, for example, the display system according to one aspect of the present disclosure includes:

an acquirer that acquires a phase difference between the first touch drive signal and the second touch drive signal;

a first setting unit that sets the first period on the basis of the phase difference acquired by the acquirer; and a second setting unit that sets the second period on the basis of the phase difference acquired by the acquirer.

In this case, the first period and the second period can be set depending on the phase difference.

The display system according to one aspect of the present disclosure may be configured as follows, for example:

a timing at which, of the first touch drive signal and the second touch drive signal, the one whose phase is delayed changes from the first voltage to the second voltage and the second timing are located between the first timing and a timing at which, of the first touch drive signal and the second touch drive signal, the one whose phase is advanced changes from the second voltage to the first voltage.

In this case, the integrated value is not affected by a current flowing through a parasitic capacitance between a common electrode of the first display device and a common electrode of the second display device, which are adjacent to each other, the current flowing due to a situation where, of the first touch drive signal and the second touch drive signal, the one whose phase is advanced changes from the second voltage to the first voltage. Accordingly, the influence of charging and discharging on the parasitic capacitance can be more reliably canceled in the integrated value.

A display system according to one aspect of the present disclosure includes:

a first display device including a plurality of first sensor electrodes;

a second display device that is arranged adjacent to the first display device and including a plurality of second sensor electrodes;

a first drive circuit that supplies a first touch drive signal to the plurality of first sensor electrodes;

a second drive circuit that supplies a second touch drive signal having a frequency same as a frequency of the first touch drive signal to the plurality of second sensor electrodes;

a first touch detection circuit that integrates a touch detection signal received from each of the plurality of first sensor electrodes during a first period and detects a touch by an object on the first display device on the basis of an integrated value; and a second touch detection circuit that integrates a touch detection signal received from each of the plurality of second sensor electrodes during a second period and detects a touch by an object on the second display device on the basis of an integrated value, in which each of the first touch drive signal and the second touch drive signal changes between a first voltage and a second voltage, each of the first period and the second period includes a period from a first timing at which, of the first touch drive signal and the second touch drive signal, the one whose phase is advanced changes from the first voltage to the second voltage to a second timing, the second timing is a timing at which a current flowing between the first sensor electrode of the first display device and the second sensor electrode of the second display device, which are adjacent to each other, becomes zero, the current flowing due to a situation where, of the first touch drive signal and the second touch drive signal, the one whose phase is delayed changes from the first voltage to the second voltage, and a timing at which the second touch drive signal changes from the first voltage to the second voltage and the second timing are located between the first timing and a timing at which the first touch drive signal changes from the second voltage to the first voltage.

According to this aspect, it becomes possible to suppress erroneous detection of a touch near the boundary between the first display device and the second display device.

The display system according to one aspect of the present disclosure may be configured as follows, for example:

the first sensor electrodes and the second sensor electrodes are common electrodes used for both image display and touch detection, a first display period in which the first display device displays an image and a first touch detection period in which the first touch detection circuit detects a touch are alternately arranged in a first frame period of the first display device, a second display period in which the second display device displays an image and a second touch detection period in which the second touch detection circuit detects a touch are alternately arranged in a second frame period of the second display device, and a start timing coincides and an end timing coincides in the first touch detection period and the second touch detection period.

In this case, it becomes possible to suppress erroneous detection of a touch near the boundary between the in-cell first display device and the in-cell second display device.

A control device according to one aspect of the present disclosure is a control device that controls a first display device including a plurality of first sensor electrodes and a second display device that is arranged adjacent to the first display device and including a plurality of second sensor electrodes, the control device including:

a first drive circuit that supplies a first touch drive signal to the plurality of first sensor electrodes;

a second drive circuit that supplies a second touch drive signal to the plurality of second sensor electrodes, the second touch drive signal having a frequency same as a frequency of the first touch drive signal and being in phase with the first touch drive signal;

a first touch detection circuit that detects a touch by an object on the first display device on the basis of a touch detection signal received from each of the plurality of first sensor electrodes; and a second touch detection circuit that detects a touch by an object on the second display device on the basis of a touch detection signal received from each of the plurality of second sensor electrodes.

According to this aspect, it becomes possible to suppress erroneous detection of a touch near the boundary between the first display device and the second display device.

A control method according to one aspect of the present disclosure is a control method for controlling a first display device including a plurality of first sensor electrodes and a second display device that is arranged adjacent to the first display device and including a plurality of second sensor electrodes, the method comprising:

supplying a first touch drive signal to the plurality of first sensor electrodes;

supplying a second touch drive signal to the plurality of second sensor electrodes, the second touch drive signal having a frequency same as a frequency of the first touch drive signal and being in phase with the first touch drive signal;

detecting a touch by an object on the first display device on the basis of a touch detection signal received from each of the plurality of first sensor electrodes; and detecting a touch by an object on the second display device on the basis of a touch detection signal received from each of the plurality of second sensor electrodes.

According to this aspect, it becomes possible to suppress erroneous detection of a touch near the boundary between the first display device and the second display device.

While various embodiments have been described herein above, it is to be appreciated that various changes in form and detail may be made without departing from the spirit and scope of the invention(s) presently or hereafter claimed.

CROSS-REFERENCE TO RELATED APPLICATIONS

This application is based upon and claims the benefit of priority from the prior Japanese Patent Application No. 2020-057757, filed on Mar. 27, 2020 and Japanese Patent Application No. 2020-207476, filed on Dec. 15, 2020, the entire contents of which are incorporated herein by reference.

What is claimed is:

1. A display system comprising:

a first display device comprising a plurality of first sensor electrodes;

a second display device that is arranged adjacent to the first display device and comprising a plurality of second sensor electrodes;

a first drive circuit that supplies a first touch drive signal to the plurality of first sensor electrodes;

a second drive circuit that supplies a second touch drive signal to the plurality of second sensor electrodes, the second touch drive signal having a frequency same as a frequency of the first touch drive signal and being in phase with the first touch drive signal;

a first touch detection circuit that detects a touch by an object on the first display device on a basis of a touch detection signal received from each of the plurality of first sensor electrodes;

a second touch detection circuit that detects a touch by an object on the second display device on a basis of a touch detection signal received from each of the plurality of second sensor electrodes;

a control device that outputs a synchronization signal;

a first clock generation circuit that generates a first reference clock signal in synchronization with the synchronization signal output from the control device; and a second clock generation circuit that generates a second reference clock signal in synchronization with the synchronization signal output from the control device, wherein the first display device and the second display device detect a touch based on a self-capacitance method, the first drive circuit generates the first touch drive signal in synchronization with the first reference clock signal, and the second drive circuit generates the second touch drive signal in synchronization with the second reference clock signal.

2. The display system according to claim 1, further comprising:

a control circuit that:

acquires a phase difference between the first touch drive signal and the second touch drive signal; and controls a phase of the first touch drive signal or the second touch drive signal such that the acquired phase difference approaches zero.

3. The display system according to claim 1, wherein each of the first touch drive signal and the second touch drive signal changes between a first voltage and a second voltage, the first touch detection circuit integrates the touch detection signal received from each of the plurality of first sensor electrodes during a first period, and detects a touch by an object on the first display device on a basis of an integrated value, the second touch detection circuit integrates the touch detection signal received from each of the plurality of second sensor electrodes during a second period, and detects a touch by an object on the second display device on a basis of an integrated value, each of the first period and the second period comprises a period from a first timing at which, of the first touch drive signal and the second touch drive signal, one whose phase is advanced changes from the first voltage to the second voltage to a second timing, and the second timing is a timing at which a current flowing between the first sensor electrode of the first display device and the second sensor electrode of the second display device, which are adjacent to each other, becomes zero, the current flowing due to a situation where, of the first touch drive signal and the second touch drive signal, one whose phase is delayed changes from the first voltage to the second voltage.

4. The display system according to claim 3, further comprising:

a control circuit that:

acquires a phase difference between the first touch drive signal and the second touch drive signal;

sets the first period on a basis of the acquired phase difference; and sets the second period on a basis of the acquired phase difference.

5. The display system according to claim 4, wherein a third timing and the second timing are located between the first timing and a fourth timing, the third timing is a timing at which, of the first touch drive signal and the second touch drive signal, the one whose phase is delayed changes from the first voltage to the second voltage, and the fourth timing is a timing at which, of the first touch drive signal and the second touch drive signal, the one whose phase is advanced changes from the second voltage to the first voltage.

6. The display system according to claim 3, wherein a third timing and the second timing are located between the first timing and a fourth timing, the third timing is a timing at which, of the first touch drive signal and the second touch drive signal, the one whose phase is delayed changes from the first voltage to the second voltage, and the fourth timing is a timing at which, of the first touch drive signal and the second touch drive signal, the one whose phase is advanced changes from the second voltage to the first voltage.

7. The display system according to claim 1, wherein the first sensor electrodes and the second sensor electrodes are common electrodes used for both image display and touch detection, a first display period in which the first display device displays an image and a first touch detection period in which the first touch detection circuit detects a touch are alternately arranged in a first frame period of the first display device, a second display period in which the second display device displays an image and a second touch detection period in which the second touch detection circuit detects a touch are alternately arranged in a second frame period of the second display device, and a start timing of the first touch detection period coincides with a start timing of the second touch detection period and an end timing of the first touch detection period coincides with an end timing of the second touch detection period.

8. A display system comprising:

a first display device comprising a plurality of first sensor electrodes;

a second display device that is arranged adjacent to the first display device and comprising a plurality of second sensor electrodes;

a first drive circuit that supplies a first touch drive signal to the plurality of first sensor electrodes;

a second drive circuit that supplies a second touch drive signal having a frequency same as a frequency of the first touch drive signal to the plurality of second sensor electrodes;

a first touch detection circuit that integrates a touch detection signal received from each of the plurality of first sensor electrodes during a first period and detects a touch by an object on the first display device on a basis of an integrated value; and a second touch detection circuit that integrates a touch detection signal received from each of the plurality of second sensor electrodes during a second period and detects a touch by an object on the second display device on a basis of an integrated value, wherein each of the first touch drive signal and the second touch drive signal changes between a first voltage and a second voltage, each of the first period and the second period comprises a period from a first timing at which, of the first touch drive signal and the second touch drive signal, one whose phase is advanced changes from the first voltage to the second voltage to a second timing, the second timing is a timing at which a current flowing between the first sensor electrode of the first display device and the second sensor electrode of the second display device, which are adjacent to each other, becomes zero, the current flowing due to a situation where, of the first touch drive signal and the second touch drive signal, one whose phase is delayed changes from the first voltage to the second voltage, and a third timing and the second timing are located between the first timing and a fourth timing, the third timing is a timing at which the second touch drive signal changes from the first voltage to the second voltage, and the fourth timing is a timing at which the first touch drive signal changes from the second voltage to the first voltage.

9. A control method for controlling a first display device comprising a plurality of first sensor electrodes and a second display device that is arranged adjacent to the first display device and comprising a plurality of second sensor electrodes, the method comprising:

supplying a first touch drive signal to the plurality of first sensor electrodes;

supplying a second touch drive signal to the plurality of second sensor electrodes, the second touch drive signal having a frequency same as a frequency of the first touch drive signal and being in phase with the first touch drive signal;

detecting a touch by an object on the first display device on a basis of a touch detection signal received from each of the plurality of first sensor electrodes;

detecting a touch by an object on the second display device on a basis of a touch detection signal received from each of the plurality of second sensor electrodes;

outputting a synchronization signal;

generating a first reference clock signal in synchronization with the synchronization signal;

generating a second reference clock signal in synchronization with the synchronization signal;

generating the first touch drive signal in synchronization with the first reference clock signal, and generating the second touch drive signal in synchronization with the second reference clock signal, wherein the first display device and the second display device detect a touch based on a self-capacitance method.

* * * * *